United States Patent
Obata

(10) Patent No.: US 9,259,906 B2
(45) Date of Patent: Feb. 16, 2016

(54) OPTICAL LAMINATED BODY, METHOD OF MANUFACTURING THE SAME, AND DISPLAY UNIT

(75) Inventor: Kei Obata, Tochigi (JP)

(73) Assignee: SONY CORPORATION, Tokyo (JP)

( * ) Notice: Subject to any disclaimer, the term of this patent is extended or adjusted under 35 U.S.C. 154(b) by 1002 days.

(21) Appl. No.: 13/403,497

(22) Filed: Feb. 23, 2012

(65) Prior Publication Data

US 2012/0224108 A1 Sep. 6, 2012

(30) Foreign Application Priority Data

Mar. 3, 2011 (JP) ................. 2011-045981

(51) Int. Cl.
| | |
|---|---|
| *H04N 9/47* | (2006.01) |
| *B32B 37/18* | (2006.01) |
| *G02F 1/1335* | (2006.01) |
| *G02B 5/30* | (2006.01) |
| *G02B 27/26* | (2006.01) |
| *H04N 13/04* | (2006.01) |

(52) U.S. Cl.
CPC ............ *B32B 37/185* (2013.01); *G02B 5/3083* (2013.01); *G02B 27/26* (2013.01); *G02F 1/133528* (2013.01); *H04N 13/0434* (2013.01); *B32B 2457/20* (2013.01); *B32B 2457/206* (2013.01); *G02F 2413/09* (2013.01)

(58) Field of Classification Search
None
See application file for complete search history.

(56) References Cited

U.S. PATENT DOCUMENTS

| | | | |
|---|---|---|---|
| 3,881,706 A | 5/1975 | Mohrmann | |
| 5,327,285 A | 7/1994 | Faris | |
| 5,676,975 A | 10/1997 | Dezes et al. | |
| 2009/0251644 A1* | 10/2009 | Park et al. ......................... | 349/96 |

FOREIGN PATENT DOCUMENTS

| | | | | |
|---|---|---|---|---|
| JP | 2005-049865 | | 2/2005 | |
| JP | 2006-307234 | | 11/2006 | |
| JP | 2007322498 A | * | 12/2007 | ............... G02B 5/30 |
| JP | 2009-300956 | | 12/2009 | |
| JP | 2012-168514 | | 9/2012 | |
| WO | WO/2009/098856 A1 | | 8/2009 | |

OTHER PUBLICATIONS

Japanese Office Examination Report issued in connection with related Japanese patent application No. 2011-045981 dated Aug. 26, 2014.

* cited by examiner

*Primary Examiner* — Heather Jones
(74) *Attorney, Agent, or Firm* — Dentons US LLP

(57) ABSTRACT

An optical laminated body includes a phase difference layer that has two or more kinds of phase difference regions having different directions of a slow axis from each other, a polarization plate contacted with a bottom face of the phase difference layer with a bonding layer or an adhesive layer in between, a base material contacted with a top face of the phase difference layer with a bonding layer or an adhesive layer in between, and an antireflection layer or an anti-glare layer directly contacted with a face not contacted with the phase difference layer of the base material.

6 Claims, 18 Drawing Sheets

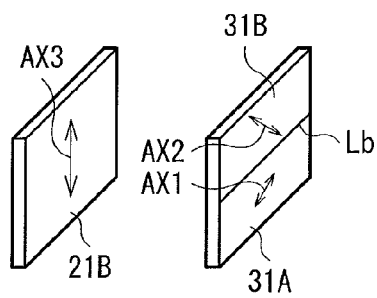
FIG. 5A
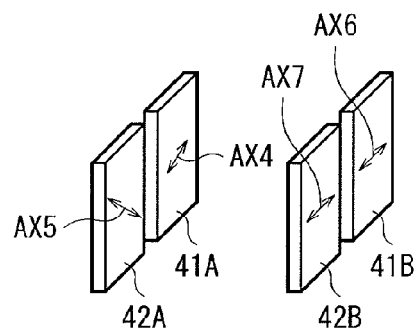
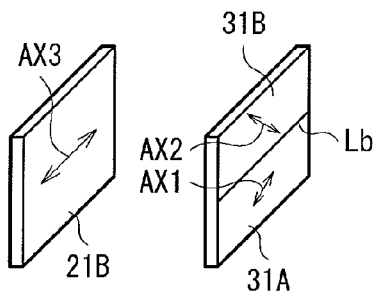
FIG. 5B
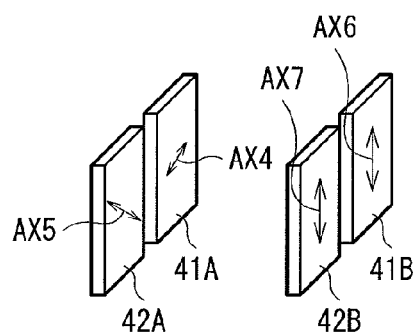
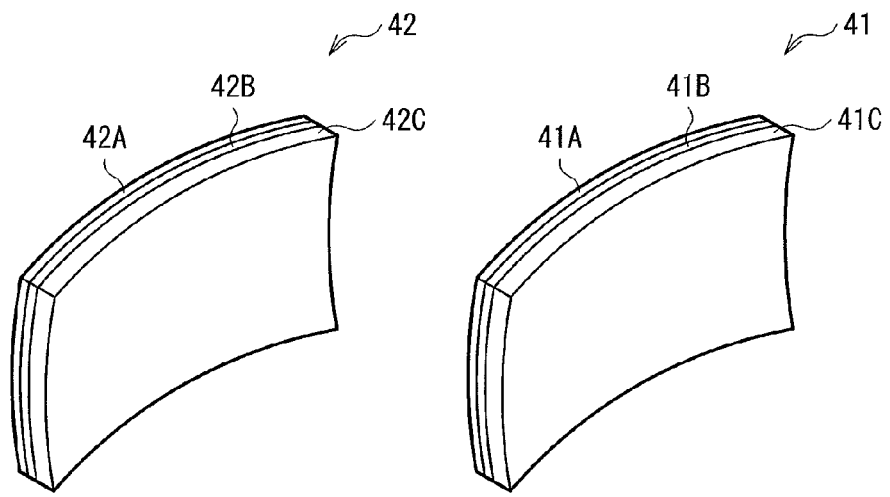
FIG. 6

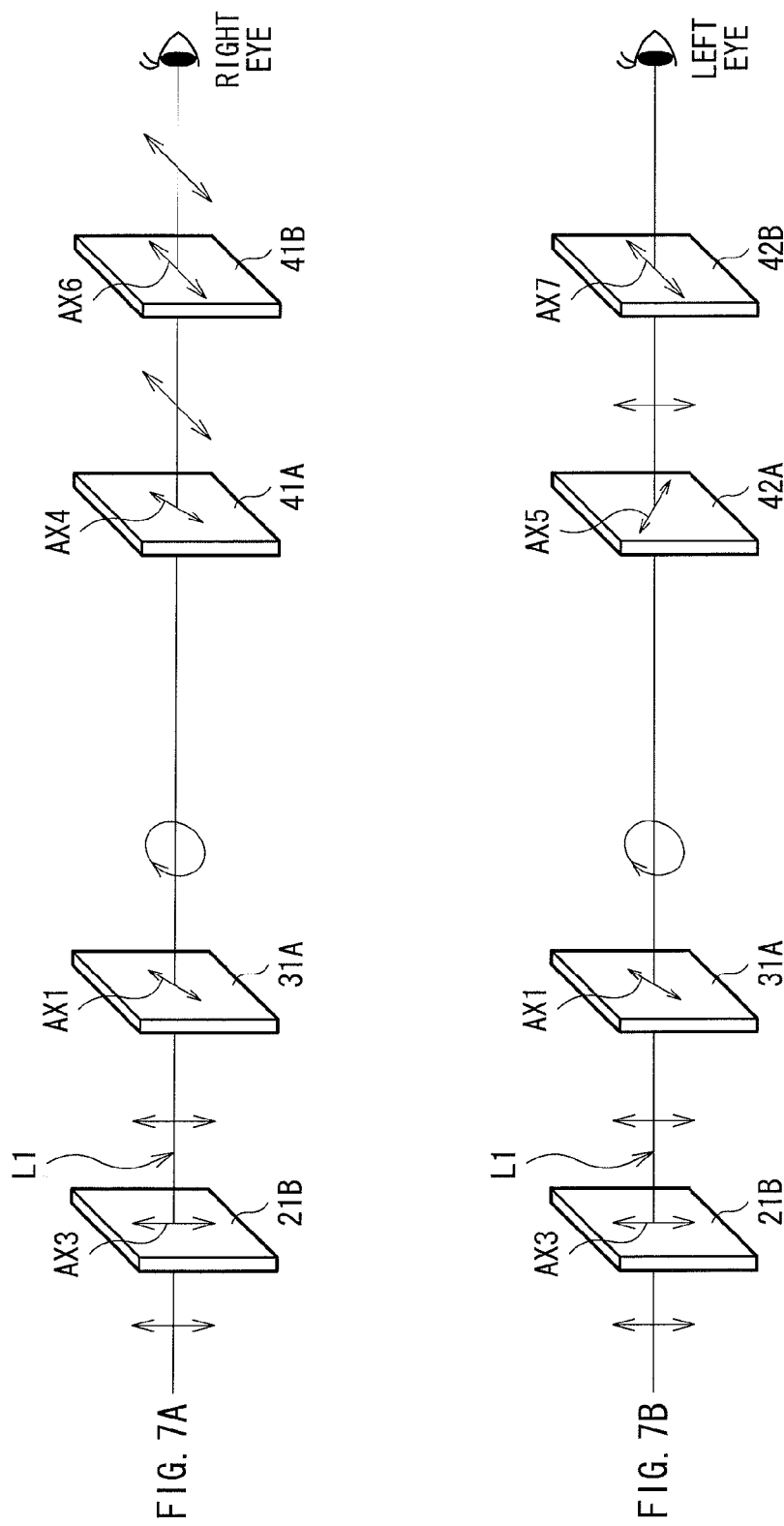

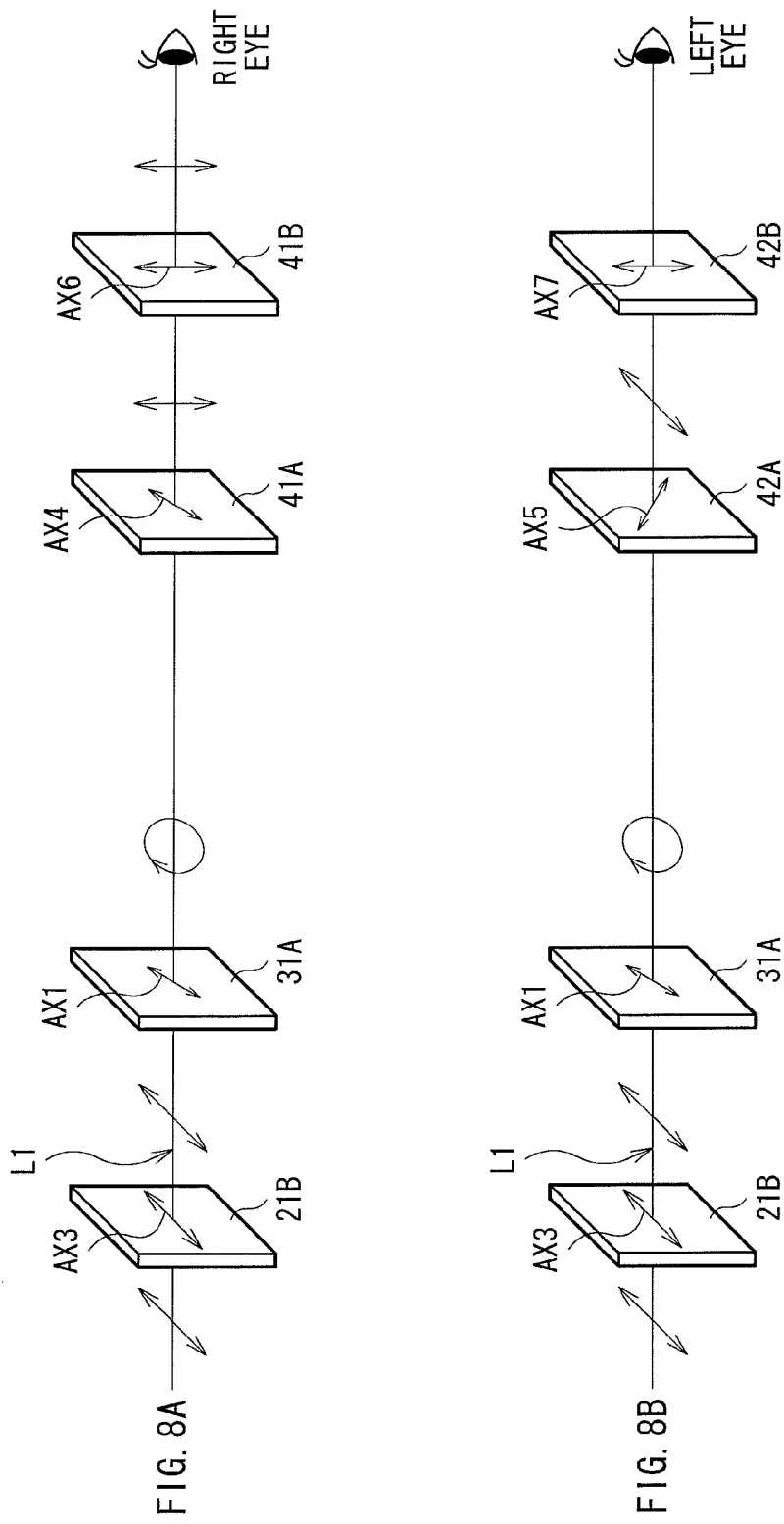

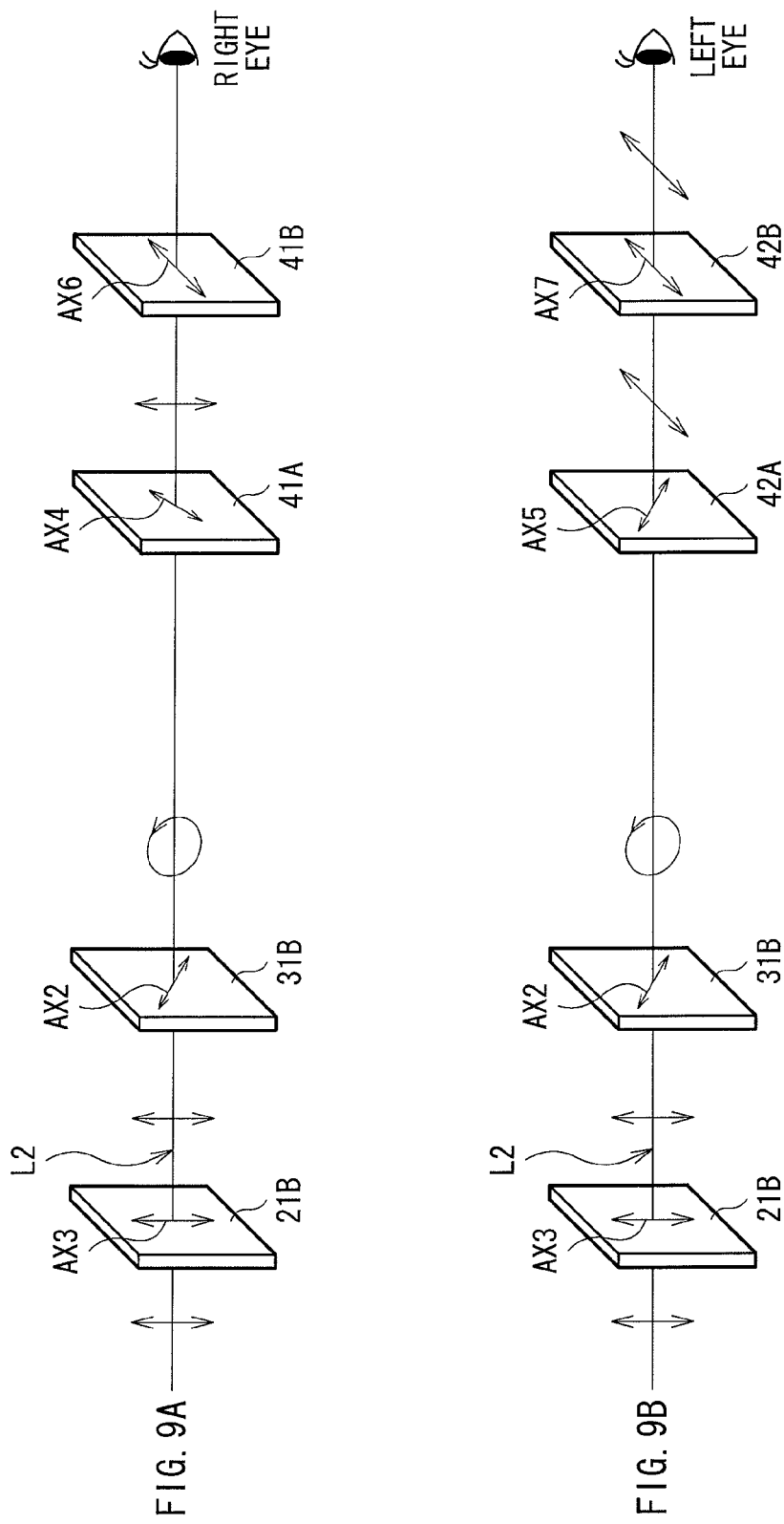

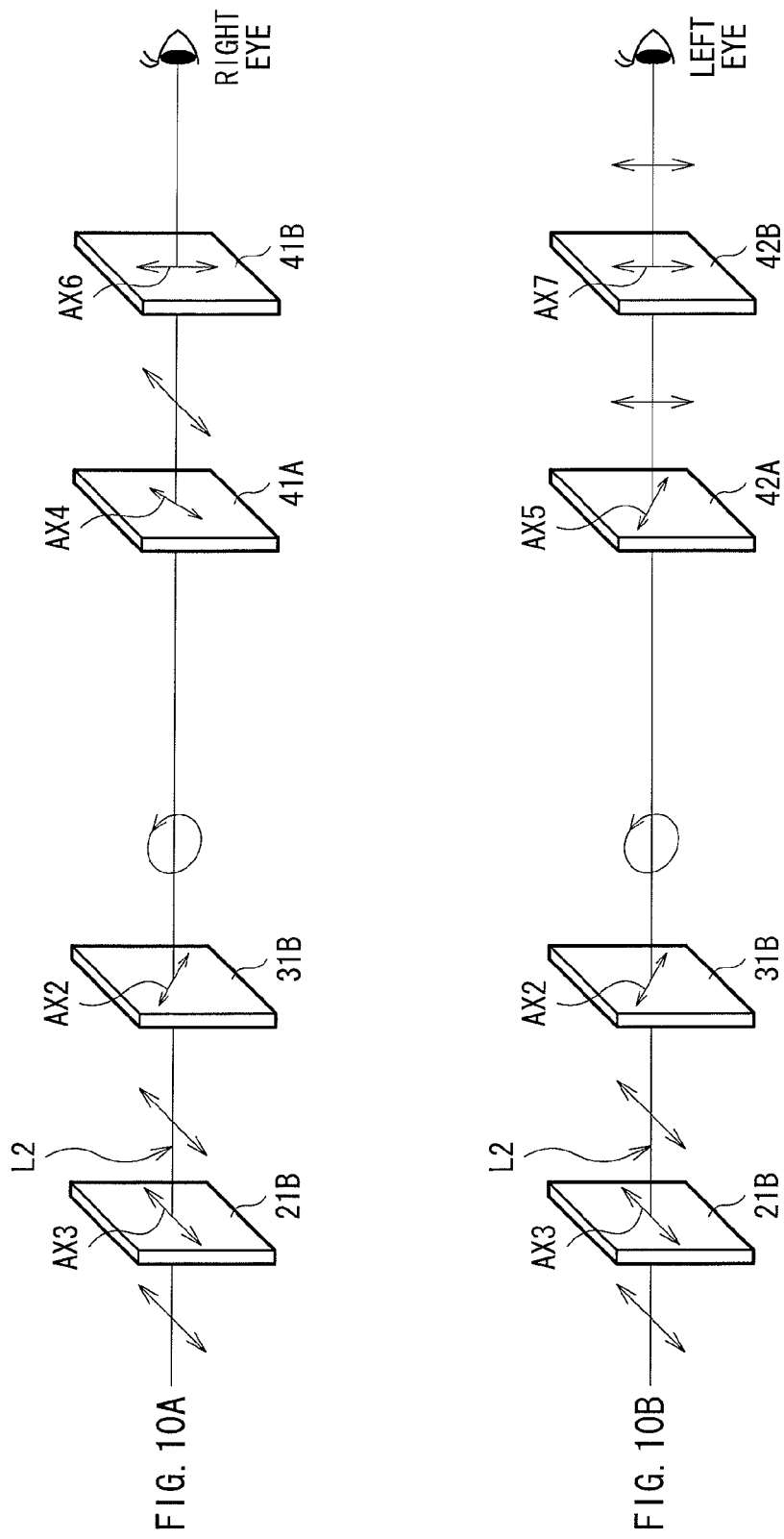

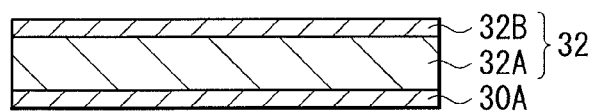
FIG. 11A
FIG. 11B
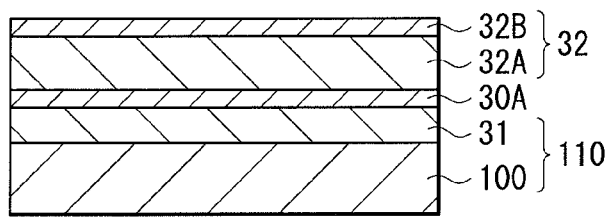
FIG. 11C

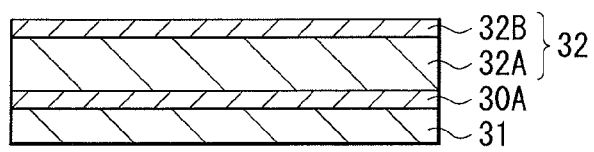
FIG. 12A
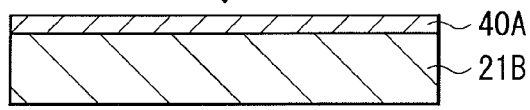
FIG. 12B
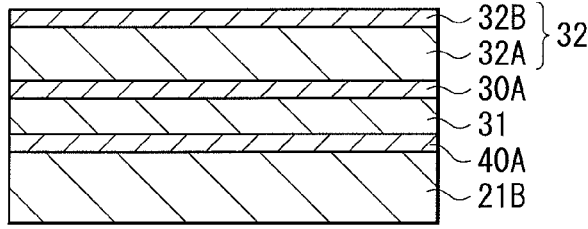
FIG. 12C
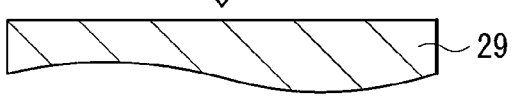
FIG. 12D

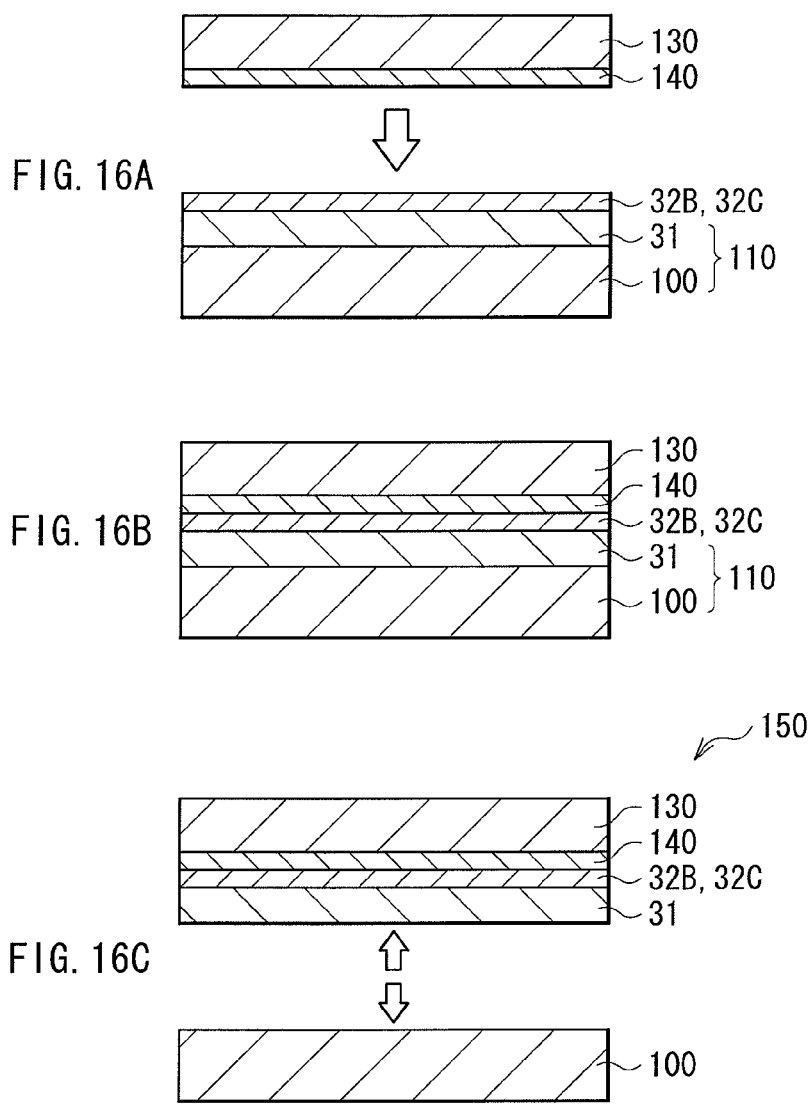

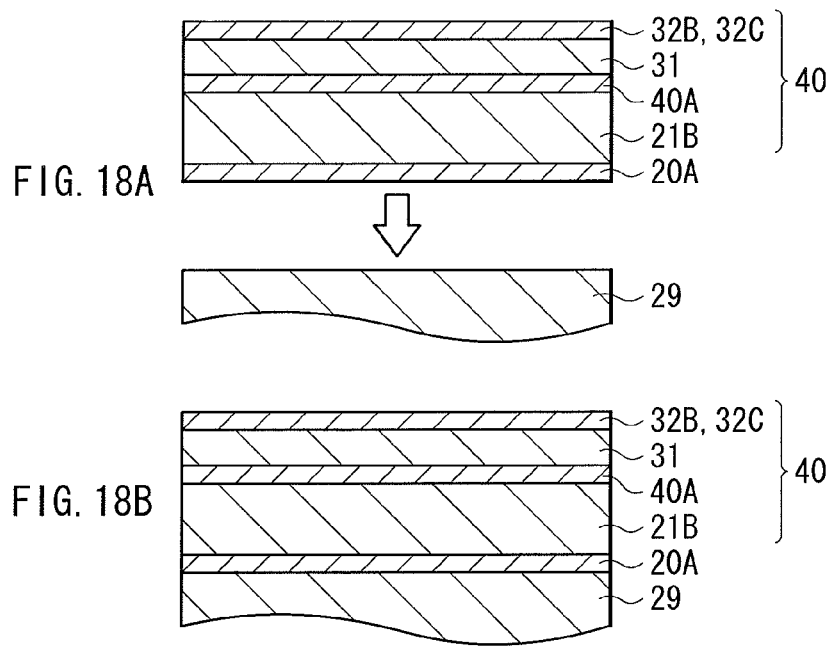
FIG. 18A
FIG. 18B
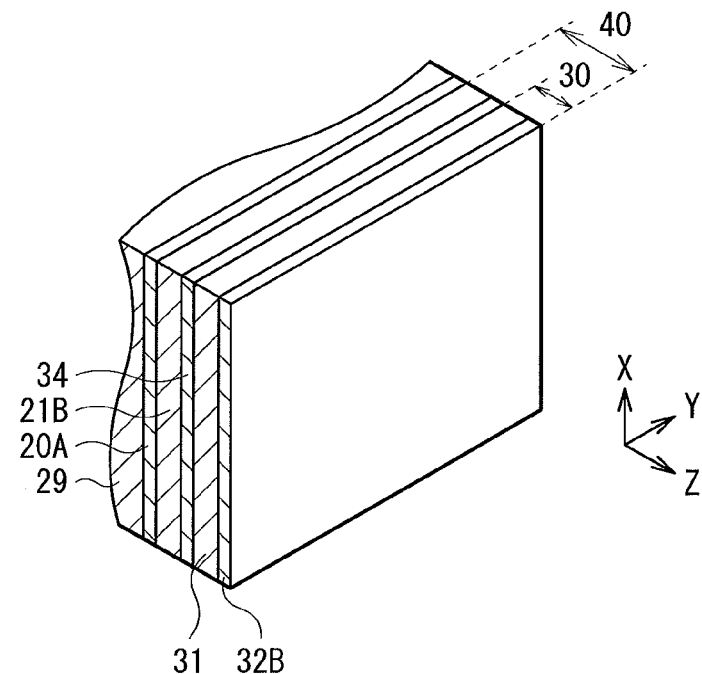
FIG. 19

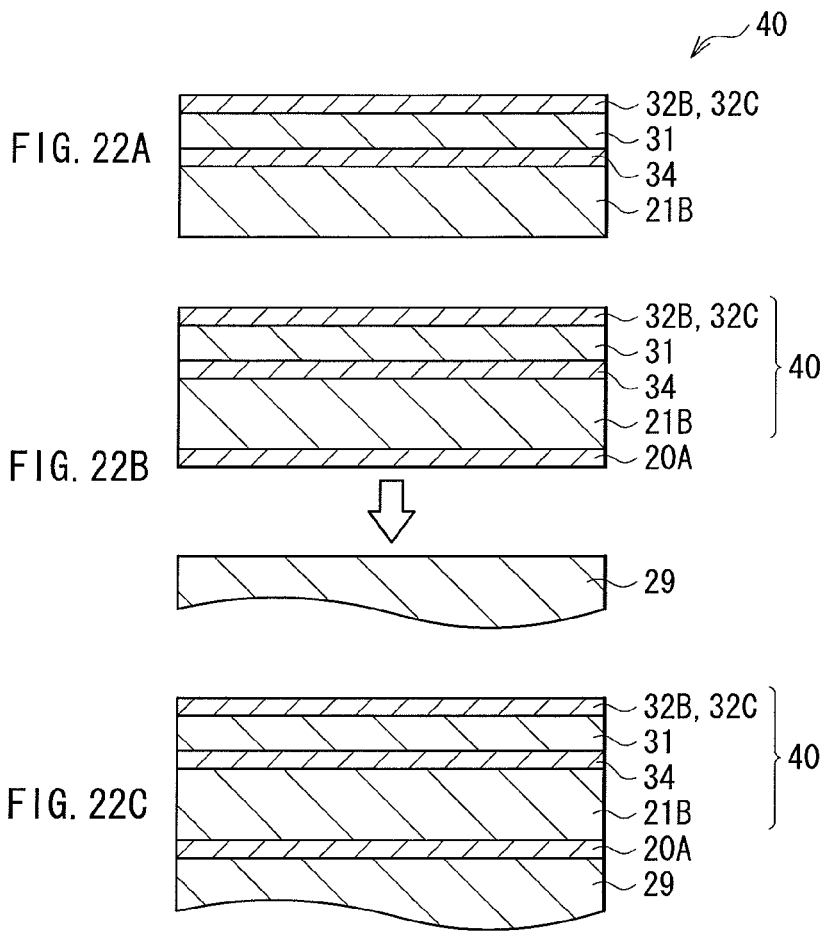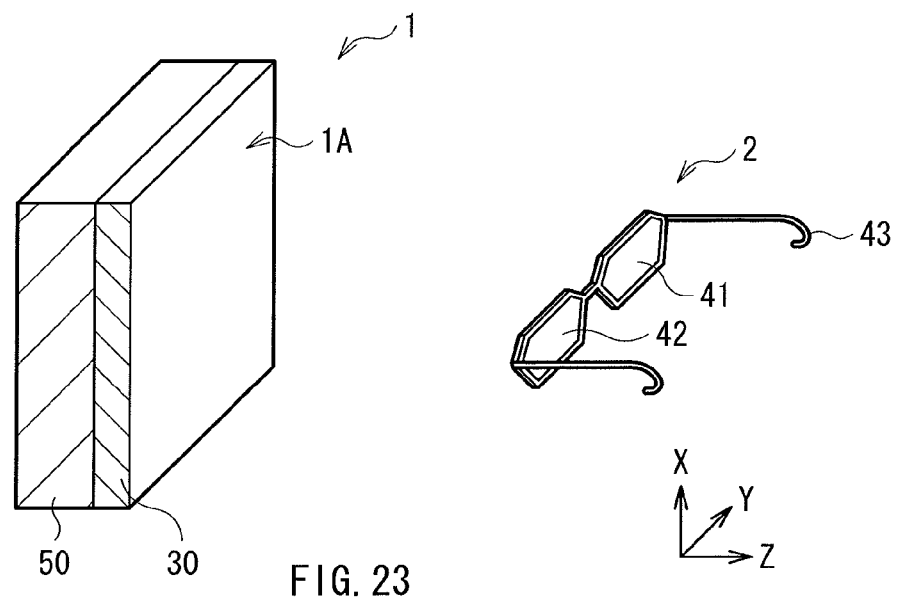

OPTICAL LAMINATED BODY, METHOD OF MANUFACTURING THE SAME, AND DISPLAY UNIT

BACKGROUND

The present disclosure relates to an optical laminated body including a phase difference layer that changes a light polarization state and a method of manufacturing the same. The present disclosure further relates to a display unit including the foregoing optical laminated body.

In the past, as a stereoscopic video display unit using polarizing glasses, there has been a display unit in which a polarization state of outputted light of a left-eye pixel is different from a polarization state of outputted light of a right-eye pixel. In such a display unit, in a state that a viewer wears the polarizing glasses, outputted light from the left-eye pixel enters only the left eye, and outputted light from the right-eye pixel enters only the right eye, and thereby a stereoscopic video is able to be observed.

For example, in U.S. Pat. No. 5,676,975 and U.S. Pat. No. 5,327,285, for the purpose of realizing a state in which the polarization state of the outputted light of the left-eye pixel is different from the polarization state of the outputted light of the right-eye pixel, providing a phase difference device in which a liquid crystal cell is partially formed or a phase difference device in which multiple kinds of phase difference materials having different slow axes from each other are arranged is proposed. Further, for example, in U.S. Pat. No. 3,881,706, providing a phase difference device formed by coating a patterned photo-alignment film with liquid crystal and polymerizing the same is proposed.

SUMMARY

The foregoing phase difference device is arranged in a video display face of a stereoscopic video display unit. Therefore, in the case where the phase difference device is thick, if a viewer views the video display face from an oblique direction, displacement between a liquid crystal cell in a display panel and the phase difference device is generated, and 3D characteristics (crosstalk) may be deteriorated. Further, according to needs, an anti-glare film or an antireflection film is provided on the phase difference device in order to improve video quality. However, if the phase difference device is thick, by contrast, 3D characteristics (crosstalk) may be significantly deteriorated by providing the anti-glare film or the antireflection film on the phase difference device.

It is desirable to provide an optical laminated body capable of decreasing deterioration of the 3D characteristics (crosstalk) and a method of manufacturing the same. Further, it is desirable to provide a display unit including such an optical laminated body.

According to an embodiment of the present disclosure, there is provided a first optical laminated body including a phase difference layer that has two or more kinds of phase difference regions having different directions of a slow axis from each other. The first optical laminated body further includes a polarization plate contacted with a bottom face of the phase difference layer with a bonding layer or an adhesive layer in between, a base material contacted with a top face of the phase difference layer with a bonding layer or an adhesive layer in between, and an antireflection layer or an anti-glare layer directly contacted with a face not contacted with the phase difference layer of the base material.

According to an embodiment of the present disclosure, there is provided a first display unit including a display panel that displays a video according to a video signal on a video display face and a phase difference device provided being contacted with the video display face. The phase difference device has a phase difference layer that has two or more kinds of phase difference regions having different directions of a slow axis from each other, a base material contacted with a top face of the phase difference layer with a bonding layer or an adhesive layer in between, and an antireflection layer or an anti-glare layer directly contacted with a face not contacted with the phase difference layer of the base material. The display panel has a polarization plate contacted with the phase difference layer with a bonding layer or an adhesive layer in between in the video display face.

In the first optical laminated body and the first display unit according to the embodiments of the present disclosure, as a base material to support the phase difference layer, the polarization plate or the base material supporting the antireflection layer or the anti-glare layer is used. Thereby, compared to a case that a base material to support the phase difference layer is provided separately, the thickness of the optical laminated body is decreased.

According to an embodiment of the present disclosure, there is provided a second optical laminated body including a phase difference layer that has two or more kinds of phase difference regions having different directions of a slow axis from each other. The second optical laminated body further includes a polarization plate directly contacted with a bottom face of the phase difference layer or contacted with the bottom face of the phase difference layer with a bonding layer or an adhesive layer in between and an antireflection layer or an anti-glare layer directly contacted with a top face of the phase difference layer.

According to an embodiment of the present disclosure, there is provided a second display unit including a display panel that displays a video according to a video signal on a video display face and a phase difference device provided being contacted with the video display face. The phase difference device has a phase difference layer that has two or more kinds of phase difference regions having different directions of a slow axis from each other and an antireflection layer or an anti-glare layer directly contacted with a top face of the phase difference layer. The display panel has a polarization plate directly contacted with the phase difference layer or contacted with the phase difference layer with a bonding layer or an adhesive layer in between in the video display face.

In the second optical laminated body and the second display unit according to the embodiments of the present disclosure, as a base material to support the phase difference layer and the antireflection layer or the anti-glare layer, the polarization plate is used. Thereby, compared to a case that a base material to support the phase difference layer is provided separately, the thickness of the optical laminated body is decreased. Accordingly, compared to a case that a base material to support the phase difference layer and the antireflection layer or the anti-glare layer is provided separately, the thickness of the optical laminated body is decreased.

According to an embodiment of the present disclosure, there is provided a first method of manufacturing an optical laminated body including the following two steps:
(Step A1) forming a first laminated body that includes, layering a phase difference film and an optical film, the phase difference film including an alignment base material having alignment function on a surface thereof, and a phase difference layer formed on the surface of the alignment base material, and having two or more kinds of phase difference regions with different directions of a slow phase axis from each other, the optical film having an antireflection layer or an anti-glare layer on a surface of a support base material, allowing the phase difference layer and the support base material to be contacted with each other with a first bonding layer or a first adhesive layer in between, and subsequently exfoliating the alignment base material; and (Step A2) forming an optical laminated body that includes layering the first laminated body and a polarization plate and allowing the phase difference layer and the polarization plate to be contacted with each other with a second bonding layer or a second adhesive layer in between.

In the first method of manufacturing an optical laminated body according to the embodiment of the present disclosure, the alignment base material is exfoliated in the course of the steps. Thereby, compared to a case that the alignment base material is not exfoliated, the thickness of the optical laminated body is decreased.

According to an embodiment of the present disclosure, there is provided a second method of manufacturing an optical laminated body including the following two steps:

(Step B1) forming a antireflection layer or an anti-glare layer on a surface of a phase difference layer of a phase difference film, the phase difference film including, an alignment base material having alignment function on a surface thereof, the phase difference layer formed on the surface of the alignment base material, and having two or more kinds of phase difference regions with different directions of a slow phase axis from each other, and subsequently layering the phase difference film and a base material and allowing the antireflection layer or an anti-glare layer and the base material to be contacted with each other with a first bonding layer or a first adhesive layer in between, and exfoliating the alignment base material; and (Step B2) forming an optical laminated body that includes, layering the first laminated body and a polarization plate and allowing the phase difference layer and the polarization plate to be contacted with each other with a second bonding layer or a second adhesive layer in between, and subsequently exfoliating the base material.

In the second method of manufacturing an optical laminated body according to the embodiment of the present disclosure, the alignment base material is exfoliated in the course of the steps. Thereby, compared to a case that the alignment base material is not exfoliated, the thickness of the optical laminated body is decreased. Further, in the embodiment of the present disclosure, as a base material to support the antireflection layer or the anti-glare layer, the base material to support the phase difference layer is used as well. Accordingly, compared to a case that a base material to support the antireflection layer or the anti-glare layer is provided separately, the thickness of the optical laminated body is decreased.

According to an embodiment of the present disclosure, there is provided a third method of manufacturing an optical laminated body including the following step:

(Step C1) depositing an alignment film, a phase difference layer that has two or more kinds of phase difference regions having different directions of a slow axis from each other, and an antireflection layer or an anti-glare layer sequentially from a polarization plate side on a surface of the polarization plate.

In the third method of manufacturing an optical laminated body according to the embodiment of the present disclosure, as a base material to support the phase difference layer and the antireflection layer or the anti-glare layer, the polarization plate is used. Accordingly, compared to a case that a base material to support the phase difference layer and the antireflection layer or the anti-glare layer is provided separately, the thickness of the optical laminated body is decreased.

In the first optical laminated body, the first display unit, the second optical laminated body, the second display unit, the first method of manufacturing an optical laminated body, the second method of manufacturing an optical laminated body, and the third method of manufacturing an optical laminated body according to the embodiments of the present disclosure, by exfoliating the base material or by using a dual purpose base material, the thickness of the optical laminated body is decreased. Therefore, deterioration of 3D characteristics (crosstalk) is able to be decreased.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 5A and 5B are conceptual diagrams illustrating an example of slow axes of a right-eye phase difference region and a left-eye phase difference region of FIG. 4B together with slow axes or transmission axes of other optical members.

FIG. 6 is a perspective view illustrating an example of a configuration of a right-eye optical device and a left-eye optical device of the polarizing glasses of FIG. 1.

FIGS. 7A and 7B are conceptual diagrams for explaining an example of slow axes and transmission axes in observing a video of the display unit of FIG. 1 by a right eye.

FIGS. 8A and 8B are conceptual diagrams for explaining another example of the slow axes and the transmission axes in observing the video of the display unit of FIG. 1 by the right eye.

FIGS. 9A and 9B are conceptual diagrams for explaining an example of the slow axes and the transmission axes in observing the video of the display unit of FIG. 1 by a left eye.

FIGS. 10A and 10B are conceptual diagrams for explaining another example of the slow axes and the transmission axes in observing the video of the display unit of FIG. 1 by the left eye.

FIGS. 11A to 11C are cross sectional views for explaining an example of a method of manufacturing an optical laminated body of FIG. 4A.

FIGS. 12A to 12D are schematic diagrams for explaining steps following the steps shown in FIGS. 11A to 11C.

FIGS. 16A to 16C are cross sectional views for explaining an example of a method of manufacturing the optical laminated bodies of FIGS. 14 and 15.

FIGS. 18A and 18B are schematic views for explaining steps following the steps shown in FIGS. 17A to 17C.

FIG. 19 is a cross sectional view illustrating an example of a third modification of the configuration of the optical laminated body of FIG. 4A.

FIGS. 22A to 22C are cross sectional views for explaining an example of a method of manufacturing the optical laminated bodies of FIGS. 19 and 20.

FIG. 23 is a perspective view illustrating another example of an internal configuration of the display unit of FIG. 1 together with the polarizing glasses.

DETAILED DESCRIPTION OF THE PREFERRED EMBODIMENT

An embodiment of the present disclosure will be described in detail with reference to the drawings. The description will be given in the following order.
1. Embodiment
Example in which a liquid crystal display panel is of a transmission type
Example in which a bonding layer or an adhesive layer is provided on the top face and the bottom face of a phase difference layer
2. Modifications
Example in which a bonding layer or an adhesive layer is provided on the top face of a phase difference layer
Example in which neither a bonding layer nor an adhesive layer is provided on the top face or the bottom face of a phase difference layer
Example in which a liquid crystal display panel is of a reflection type.

1. Embodiment

Configuration of Display Unit 1

Figure 1:
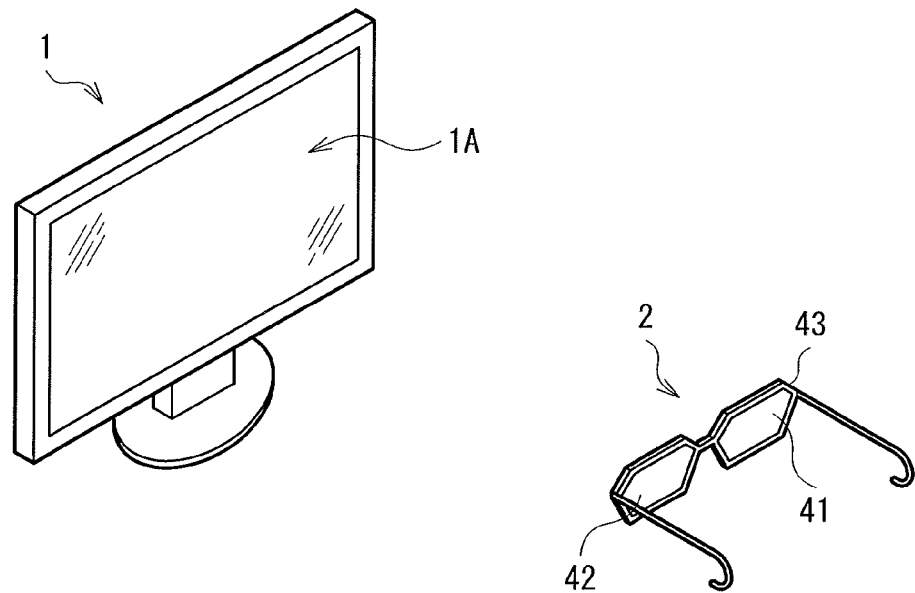
FIG. 1 is a perspective view illustrating an example of a configuration of a display unit according to an embodiment of the present disclosure together with polarizing glasses.
Figure 2:
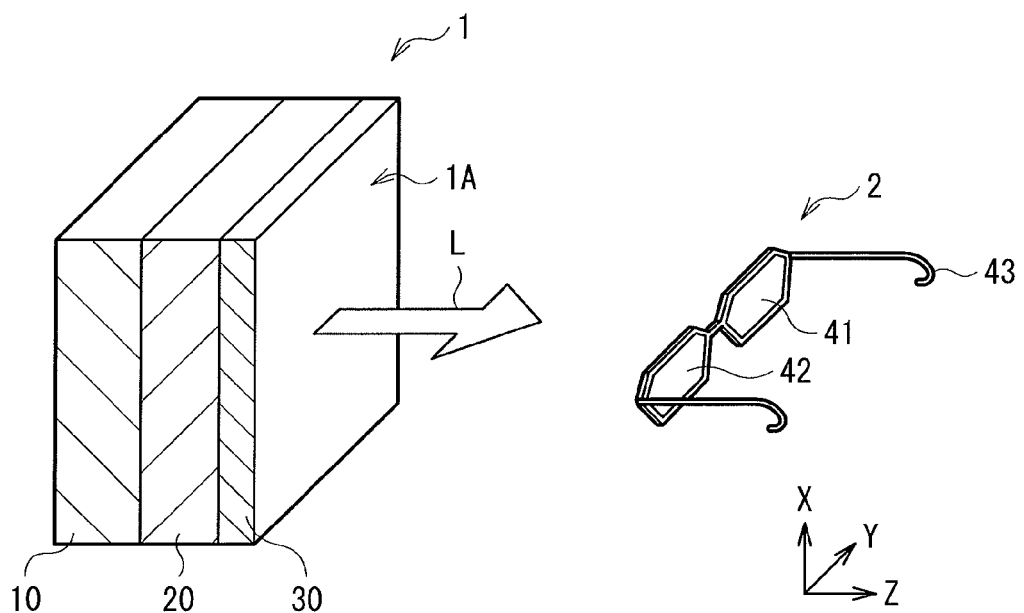
FIG. 2 is a diagram illustrating an example of an internal configuration of the display unit of FIG. 1 together with the polarizing glasses.

FIG. 1 perspectively illustrates a display unit 1 according to an embodiment of the present disclosure together with after-mentioned polarizing glasses 2. FIG. 2 illustrates an example of a cross sectional structure of the display unit 1 of FIG. 1 together with the polarizing glasses 2. The display unit 1 is a polarizing glasses type display unit that displays a stereoscopic video for an observer (not illustrated) wearing the polarizing glasses 2 in front of his eyeballs. In the display unit 1, for example, as illustrated in FIG. 2, a backlight unit 10, a liquid crystal display panel 20, and a phase difference device 30 are layered in this order. In the display unit 1, a surface of the phase difference device 30 is a video display face 1A, and is oriented to the observer side.

In this embodiment, the display unit 1 is arranged so that the video display face 1A is parallel to the vertical plane. The video display face 1A is, for example, in the shape of a rectangle, and a longitudinal direction of the video display face 1A is, for example, parallel to the horizontal direction (y-axis direction in the figure). The observer observes the video display face 1A in a state of wearing the polarizing glasses 2 in front of his eyeballs. The polarizing glasses 2 are circular polarization type glasses. The display unit 1 is a display unit for circular polarization type glasses.

(Backlight Unit 10)

The backlight unit 10 has, for example, a reflecting plate, a light source, and an optical sheet (not illustrated). The reflecting plate returns outputted light from the light source to the optical sheet side, and has functions such as reflection, scattering, and diffusion. The reflecting plate is made of, for example, foamed PET (polyethylene terephthalate) or the like. Thereby, the outputted light from the light source is able to be used effectively. The light source illuminates the liquid crystal display panel 20 from behind. For example, in the light source, a plurality of linear light sources are arranged in parallel at even intervals, or a plurality of point light sources are arranged two-dimensionally. Examples of the linear light source include a Hot Cathode Fluorescent Lamp (HCFL) and a Cold Cathode Fluorescent Lamp (CCFL). Examples of the point light source include a Light Emitting Diode (LED). The optical sheet is intended to uniformize in-plane luminance distribution of light from the light source, or adjust a divergence angle and polarization state of light from the light source in a desired range. The optical sheet includes, for example, a diffusion plate, a diffusion sheet, a prism sheet, a reflective polarization device, a wave plate and the like. Further, the light source may be of an edge light type. In this case, a light guide plate and a light guide film are used according to needs.

(Liquid Crystal Display Panel 20)

Figure 3:
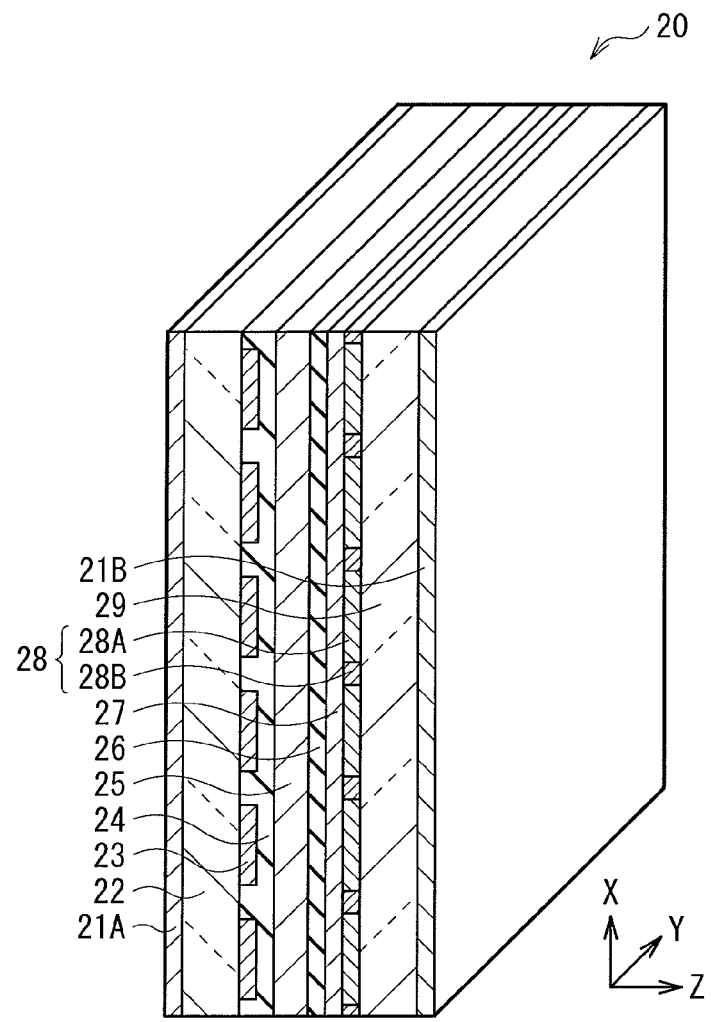
FIG. 3 is a cross sectional view illustrating an example of a configuration of a liquid crystal display panel of FIG. 2.

The liquid crystal display panel 20 is a transmissive display panel in which a plurality of pixels are two-dimensionally arrayed in a row direction and in a column direction, and displays an image by driving each pixel according to a video signal. For example, as illustrated in FIG. 2 and FIG. 3, the liquid crystal display panel 20 has a polarization plate 21A, a transparent substrate 22, a pixel electrode 23, an alignment film 24, a liquid crystal layer 25, an alignment film 26, a common electrode 27, a color filter 28, a transparent electrode 29, and a polarization plate 21B sequentially from the backlight unit 10 side.

The polarization plate 21A is a polarization plate arranged on the light entrance side of the liquid crystal display panel 20. The polarization plate 21B is a polarization plate arranged on the light output side of the liquid crystal display panel 20. The polarization plates 21A and 21B are a kind of optical shutter, and transmit only light in a specific oscillation direction (polarized light). The polarization plates 21A and 21B are arranged so that, for example, the polarization axis thereof are different from each other by a given angle (for example, 90 deg). Thereby, outputted light from the backlight unit 10 is transmitted through the liquid crystal layer or blocked. The shape of the polarization plate is not limited to a plate.

A direction of a transmission axis of the polarization plate 21A is set in a range in which the light outputted from the backlight unit 10 is able to be transmitted. For example, in the case where a polarization axis of the light outputted from the backlight unit 10 is in the vertical direction, the transmission axis of the polarization plate 21A is also in the vertical direction. In the case where the polarization axis of the light outputted from the backlight unit 10 is in the horizontal direction, the transmission axis of the polarization plate 21A is also in the horizontal direction. The light outputted from the backlight unit 10 is not limited to linear polarized light, but may be circular polarized light, elliptically-polarized light, or non-polarized light.

A direction of a polarization axis of the polarization plate 21B is set in a range in which light transmitted through the liquid crystal display panel 20 is able to be transmitted. For example, in the case where the polarization axis of the polarization plate 21A is in the horizontal direction, the polarization axis of the polarization plate 21B is in the direction perpendicular to the polarization axis of the polarization plate 21A (vertical direction). Further, for example, in the case where the polarization axis of the polarization plate 21A is in the vertical direction, the polarization axis of the polarization plate 21B is in the direction perpendicular to the polarization axis of the polarization plate 21A (horizontal direction). It is to be noted that the foregoing "polarization axis" is synonymous with the foregoing "transmission axis".

The transparent substrates 22 and 29 are generally a substrate transparent to visible light. In the transparent substrate 22 on the backlight unit 10 side, for example, an active drive circuit including a TFT (Thin Film Transistor) as a drive device electrically connected to the pixel electrode 23, a wiring, and the like is formed. The pixel electrode 23 is composed of, for example, Indium Tin Oxide (ITO), and functions as an electrode for every pixel. The alignment films 24 and 26 are made of, for example, a polymer material such as polyimide, and perform alignment treatment for liquid crystal. The liquid crystal layer 25 is composed of, for example, liquid crystal in a vertical alignment (VA) mode, an in-plane Switching (IPS) mode, a twisted nematic (TN) mode, or a super twisted nematic (STN) mode. The liquid crystal layer 25 has a function to transmit or block the outputted light from the backlight unit 10 for every pixel according to an applied voltage from a drive circuit (not illustrated). The common electrode 27 is composed of, for example, ITO, and functions as a counter electrode common to the respective pixel electrodes 23. In the color filter 28, a filter section 28A for subjecting the outputted light from the backlight unit 10 to color separation into red (R), green (G), and blue (B) is arranged. In the color filter 28, a black matrix section 28B having a light shielding function is provided in a section corresponding to an interface between pixels.

(Phase Difference Device 30)

Figure 4A:
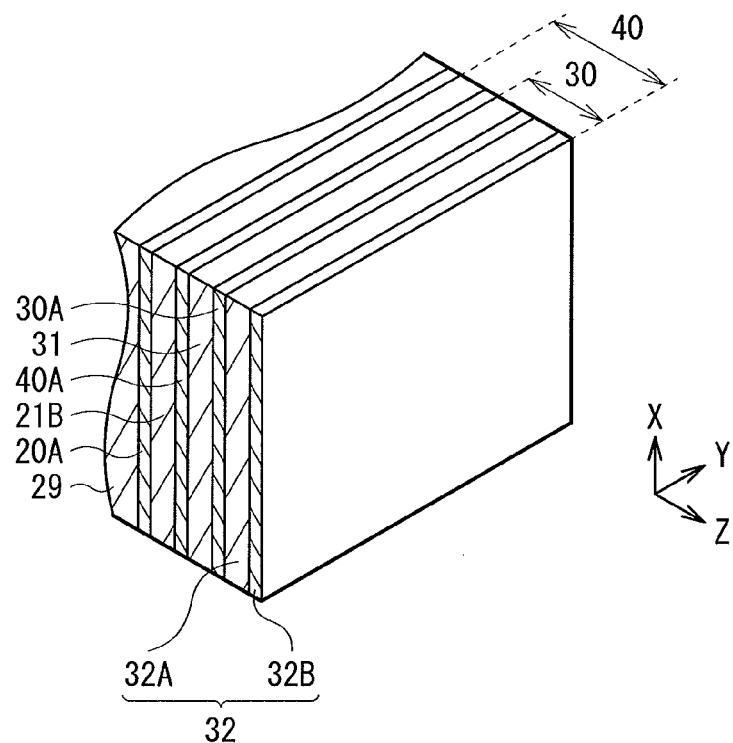
FIGS. 4A and 4B are cross sectional views illustrating an example of a configuration of a phase difference device of FIG. 2 together with a polarization plate.

Next, a description will be given of the phase difference device 30. FIG. 4A illustrates an example of a cross sectional configuration of the phase difference device 30. The phase difference device 30 is bonded to the surface (polarization plate 21B) on the light output side of the liquid crystal display panel 20 with an adhesive layer 40A in between. The phase difference device 30 may be bonded to the surface (polarization plate 21B) on the light output side of the liquid crystal display panel 20 with a bonding layer (not illustrated) in between instead of the adhesive layer 40A. The adhesive layer 40A has adherence literally, and is made of, for example, a glue. The foregoing bonding layer is solidified in a state that the polarization plate 21B and the phase difference device 30 are joined thereby, and is made of, for example, a dried bond.

In practice, for example, as illustrated in FIG. 4A, the polarization plate 21B is bonded to the surface of the transparent substrate 29 with an adhesive layer 20A in between. In FIG. 4A, a name "optical laminated body 40" is given to a body in which the phase difference device 30 is bonded to the polarization plate 21B with the adhesive layer 40A in between. The optical laminated body 40 means a laminated body of various optical members bonded to the surface of the transparent substrate 29. The thickness of the optical laminated body 40 is one of parameters to regulate 3D characteristics (crosstalk) of the display unit 1. The crosstalk is defined by the following formulas.

Crosstalk of left-eye image light=(luminance in the case where the left-eye image light is viewed through a right-eye optical device 41 (described later) of the polarizing glasses 2)/(luminance in the case where the left-eye image light is viewed through a left-eye optical device 42 (described later) of the polarizing glasses 2)     1

Crosstalk of right-eye image light=(luminance in the case where the right-eye image light is viewed through the left-eye optical device 42 of the polarizing glasses 2)/(luminance in the case where the right-eye image light is viewed through the right-eye optical device 41 of the polarizing glasses 2)     2

The polarization plate 21B may be bonded to the surface of the transparent substrate 29 with a bonding layer (not illustrated) in between instead of the adhesive layer 20A. The adhesive layer 20A has adherence literally, and is made of, for example, a glue. The foregoing bonding layer is solidified in a state that the transparent substrate 29 and the polarization plate 21B are joined thereby, and is made of, for example, a dried bond.

The phase difference device 30 changes polarization state of light transmitted through the polarization plate 21B of the liquid crystal display panel 20. In the phase difference device 30, for example, as illustrated in FIG. 4A, a phase difference layer 31, an adhesive layer 30A, and an anti-glare film 32 are layered sequentially from the liquid crystal display panel 20 side. The adhesive layer 30A is contacted with both the phase difference layer 31 and the anti-glare film 32. The phase difference device 30 may have a bonding layer (not illustrated) instead of the adhesive layer 30A. It is to be noted that the adhesive layer 30A has adherence literally, and is made of, for example, glue. The foregoing bonding layer is solidified in a state that the phase difference layer 31 and the anti-glare film 32 are joined thereby, and is made of, for example, a dried bond.

Figure 4B:
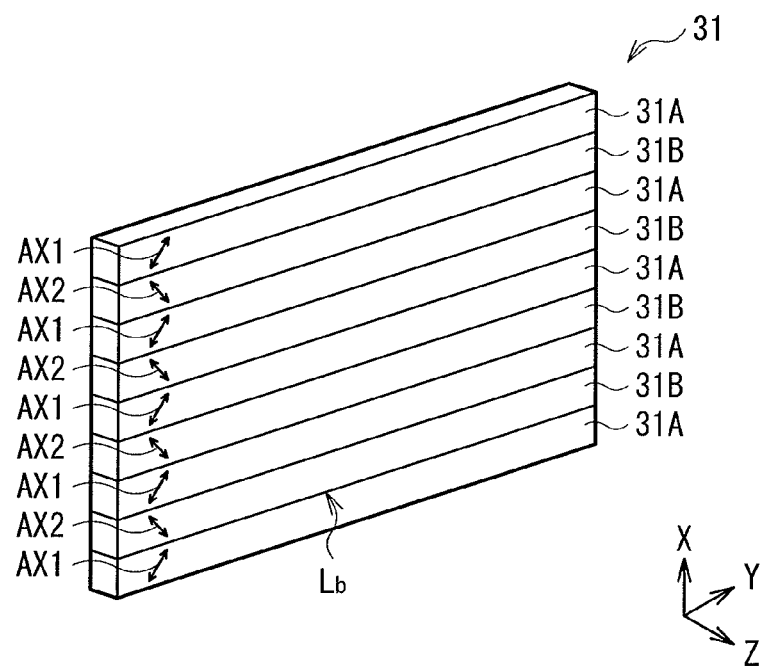

The phase difference layer 31 is a thin layer having optical anisotropy. The phase difference layer 31 has, for example, as illustrated in FIG. 4B, two kinds of phase difference regions (a right-eye phase difference region 31A and a left-eye phase difference region 31B) having different directions of a slow axis from each other. The right-eye phase difference region 31A and the left-eye phase difference region 31B have a strip shape extending in one common direction (horizontal direction). The right-eye phase difference region 31A and the left-eye phase difference region 31B are arranged alternately in the short-side direction (vertical direction) of the right-eye phase difference region 31A and the left-eye phase difference region 31B.

For example, as illustrated in FIGS. 4B to 5B, the right-eye phase difference region 31A has a slow axis AX1 in the direction intersecting with a polarization axis AX3 of the polarization plate 21B at 45 deg. Meanwhile, for example, as illustrated in FIGS. 4B to 5B, the left-eye phase difference region 31B has a slow axis AX2 in the direction that intersects with the polarization axis AX3 of the polarization plate 21B at 45 deg and that is perpendicular to the slow axis AX1. For example, as illustrated in FIGS. 5A and 5B, the slow axes AX1 and AX2 are respectively in the 45-degree diagonal direction in the case where the polarization axis AX3 of the polarization plate 21B is in the vertical direction or in the horizontal direction. Further, though not illustrated, in the case where the polarization axis AX3 of the polarization plate 21B is in the 45-degree diagonal direction, the slow axis AX1 extends, for example, in the horizontal direction, and the slow axis AX2 is, for example, in the vertical direction.

Further, for example, as illustrated in FIGS. 5A and 5B, the slow axis AX1 is in the same direction as that of a slow axis AX4 of a right-eye wave plate 41A of the polarizing glasses 2 described later, and is in the direction different from that of a slow axis AX5 of a left-eye wave plate 42A of the polarizing glasses 2 described later. Meanwhile, for example, as illustrated in FIGS. 5A and 5B, the slow axis AX2 is in the same direction as that of the slow axis AX5, and is in the direction different from that of the slow axis AX4.

The phase difference layer 31 contains, for example, a polymerized polymer liquid crystal material. That is, in the phase difference layer 31, an alignment state of liquid crystal molecules is fixed. As the polymer liquid crystal material, a material selected according to the phase transition temperature (liquid crystal phase-isotropic phase), the refractive index wavelength dispersive characteristics of the liquid crystal material, the viscosity characteristics, the process temperature, and the like is used. However, in view of transparency, the polymer liquid crystal material preferably has an acryloyl group or a metacryloyl group as a polymerized group. Further, as the polymer liquid crystal material, a material with no methylene spacer between a polymerizable functional group and a liquid crystal skeleton is preferably used, since thereby alignment treatment temperature at the time of process is able to be decreased. The thickness of the phase difference layer 31 is, for example, from 1 μm to 2 μm both inclusive. In the case where the phase difference layer 31 contains the polymerized polymer liquid crystal material, the phase difference layer 31 is not necessarily made of only the polymer liquid crystal material, and a non-polymerized liquid crystalline monomer may be contained therein as part thereof, since the non-polymerized liquid crystalline monomer contained in the phase difference layer 31 is aligned in the direction similar to the alignment direction of liquid crystal molecules existing around the non-polymerized liquid crystalline monomer by alignment treatment (heat treatment) described later, and has alignment characteristics similar to alignment characteristics of the polymer liquid crystal material.

In the phase difference layer 31, retardation values of the right-eye phase difference region 31A and the left-eye phase difference region 31B are set by adjusting the component material and the thickness of the right-eye phase difference region 31A and the left-eye phase difference region 31B. In the case where the adhesive layers 20A, 40A, and 30A and the anti-glare film 32 have phase differences, the retardation values are preferably set considering the phase differences of the adhesive layers 20A, 40A, and 30A and the anti-glare film 32 as well. It is to be noted that, in this embodiment, the material and the thickness of the right-eye phase difference region 31A and the left-eye phase difference region 31B are identical with each other. Thereby, the absolute values of retardation of the right-eye phase difference region 31A and the left-eye phase difference region 31B are identical with each other.

Next, a description will be given of the anti-glare film 32. The anti-glare film 32 diffuses and reflects outside light on the screen surface in order to decrease deterioration of visibility due to reflection of outside light such as sun light and indoor lighting. For example, as illustrated in FIG. 4A, in the anti-glare film 32, a base material 32A and an anti-glare layer 32B are layered sequentially from the phase difference layer 31 side.

Though not illustrated, the base material 32A and the anti-glare layer 32B may be layered sequentially from the opposite side from the phase difference layer 31. Further, the structure of the anti-glare film 32 is not limited to the two layer structure as illustrated in FIG. 4A. The structure of the anti-glare film 32 may be a structure in which, for example, the foregoing anti-glare layer 32B is omitted, and concavity and convexity (for example, an emboss) are provided on the top face of the base material 32A. Further, the anti-glare film 32 may include a hard coating layer according to needs.

As the base material 32A, for example, a material having small optical anisotropy, that is, a material having small double refraction is preferably used. Examples of such a transparent resin film having the foregoing characteristics include TAC (triacetyl cellulose), COP (cycloolefin polymer), COC (cycloolefin copolymer), and PMMA (polymethyl methacrylate).

The anti-glare layer 32B is obtained by coating the surface of the base material 32A with a mixed solution in which a filler is dispersed in an energy hardening resin binder, and giving energy such as heat and ultraviolet to the resultant and hardening the resultant. On the top face of the anti-glare layer 32B, concavity and convexity are formed by, for example, a filler or the like. The top face of the anti-glare layer 32B is not necessarily in the shape of concavity and convexity.

[Configuration of Polarizing Glasses 2]

Next, a description will be given of the polarizing glasses 2 with reference to FIG. 1, FIG. 2, and FIG. 6. The polarizing glasses 2 are set in front of eyeballs of an observer (not illustrated). The polarizing glasses 2 are used by the observer in observing a video displayed on the video display face 1A of the display unit 1. The polarizing glasses 2 are, for example, circularly-polarizing glasses. For example, as illustrated in FIG. 1 and FIG. 2, the polarizing glasses 2 have the right-eye optical device 41, the left-eye optical device 42, and a frame 43.

The frame 43 supports the right-eye optical device 41 and the left-eye optical device 42. The shape of the frame 43 is not particularly limited. For example, as illustrated in FIG. 1 and FIG. 2, the frame 43 may be intended to be put on a nose and ears of an observer (not illustrated). Alternately, though not illustrated, the frame 43 may be intended to be put only on the nose of the observer. Alternately, for example, though not illustrated, the frame 43 may be gripped with a hand of the observer.

The right-eye optical device 41 and the left-eye optical device 42 are used in a state that the right-eye optical device 41 and the left-eye optical device 42 are opposed to the video display face 1A of the display unit 1. As illustrated in FIG. 1 and FIG. 2, the right-eye optical device 41 and the left-eye optical device 42 are preferably used in a state that the right-eye optical device 41 and the left-eye optical device 42 are arranged in one horizontal plane as much as possible, or may be used in a state that the right-eye optical device 41 and the left-eye optical device 42 are arranged in a slightly tilted flat plane.

The right-eye optical device 41 has, for example, as illustrated in FIG. 6, the right-eye wave plate 41A, a polarization plate 41B, and a support 41C. The right-eye wave plate 41A, the polarization plate 41B, and the support 41C are arranged sequentially from the incident side of light L outputted from the video display face 1A of the display unit 1 (display unit 1 side). Meanwhile, for example, as illustrated in FIG. 6, the left-eye optical device 42 has the left-eye wave plate 42A, a polarization plate 42B, and a support 42C. The left-eye wave plate 42A, the polarization plate 42B, and the support 42C are arranged sequentially from the incident side of the light L outputted from the video display face 1A of the display unit 1 (display unit 1 side).

The supports 41C and 42C are able to be omitted according to needs. Further, the right-eye optical device 41 and the left-eye optical device 42 may have a member other than the foregoing exemplified members. For example, a protective film (not illustrated) for preventing a breakage piece from flying apart to an eyeball of the observer at the time of breakage of the supports 41C and 42C or a coating layer (not illustrated) for protection may be provided on the light output side of the supports 41C and 42C (observer side).

The support 41C supports, for example, the right-eye wave plate 41A and the polarization plate 41B. The support 41C is made of, for example, a resin transparent to the light L outputted from the video display face 1A of the display unit 1 such as PC (polycarbonate). Further, the support 42C supports, for example, the left-eye wave plate 42A and the polarization plate 42B. The support 42C is made of, for example, a resin transparent to the light L outputted from the video display face 1A of the display unit 1 such as PC (polycarbonate).

The polarization plates 41B and 42B transmit only light (polarized light) in a specific oscillation direction. For example, as illustrated in FIGS. 5A and 5B, polarization axes AX6 and AX7 of the polarization plates 41B and 42B are respectively in the direction perpendicular to the polarization axis AX3 of the polarization plate 21B of the display unit 1. For example, as illustrated in FIG. 5A, the polarization axes AX6 and AX7 are respectively in the horizontal direction in the case where the polarization axis AX3 of the polarization plate 21B is in the vertical direction. Meanwhile, for example, as illustrated in FIG. 5B, the polarization axes AX6 and AX7 are respectively in the vertical direction in the case where the polarization axis AX3 of the polarization plate 21B is in the horizontal direction. Further, though not illustrated, in the case where the polarization axis AX3 of the polarization plate 21B is in the 45-degree diagonal direction, the polarization axes AX6 and AX7 are in the direction perpendicular thereto (−45 deg).

The right-eye wave plate 41A and the left-eye wave plate 42A are a thin layer or a film having optical anisotropy. As the phase difference film, a film having small optical anisotropy, that is, a film having small double refraction is preferably used. Examples of a resin film having such characteristics include COP (cycloolefin polymer) and PC (polycarbonate). Examples of COP include Zeonor and Zeonex (registered trademark of Zeon Corporation) and Arton (registered trademark of JSR Corporation).

As illustrated in FIGS. 5A and 5B, the slow axis AX4 of the right-eye wave plate 41A is in the direction intersecting with the polarization axis AX6 at 45 deg. Further, as illustrated in FIGS. 5A and 5B, the slow axis AX5 of the left-eye wave plate 42A is in the direction intersecting with the polarization axis AX7 at 45 deg and is in the direction perpendicular to the slow axis AX4. For example, as illustrated in FIGS. 5A and 5B, in the case where the slow axes AX6 and AX7 are in the horizontal direction or the vertical direction, the slow axes AX4 and AX5 are respectively in the direction intersecting with both the horizontal direction and the vertical direction. Further, though not illustrated, in the case where the slow axes AX6 and AX7 are in the 45-degree diagonal direction, the slow axis AX4 is, for example, in the horizontal direction, and the slow axis AX5 is, for example, in the vertical direction.

Further, the slow axis AX4 is in the same direction as that of the slow axis AX1 of the right-eye phase difference region 31A, and is in the direction different from that of the slow axis AX2 of the left-eye phase difference region 31B. Meanwhile, the slow axis AX5 is in the same direction as that of the slow axis AX2, and is in the direction different from that of the slow axis AX1.

(Retardation)

Next, a description will be given of retardation of the polarizing glasses 2 with reference to FIGS. 7A and 7B to FIGS. 10A and 10B.

FIGS. 7A and 7B and FIGS. 8A and 8B are conceptual diagrams that exemplify how light L1 is recognized by right and left eyes through the polarizing glasses 2 while focusing attention on only the right-eye image light L1 entering the right-eye phase difference region 31A of the phase difference layer 31. Further, FIGS. 9A and 9B and FIGS. 10A and 10B are conceptual diagrams that exemplify how light L2 is recognized by right and left eyes through the polarizing glasses 2 while focusing attention on only the left-eye image light L2 entering the right-eye region 31B of the phase difference layer 31. It is to be noted that in practice, the right-eye image light L1 and the left-eye image light L2 are outputted in a mixed state. However, in FIGS. 7A and 7B to FIGS. 10A and 10B, as a matter of convenience, the right-eye image light L1 and the left-eye image light L2 are separately described.

In the case where the video display face of the display unit 1 is observed by using the polarizing glasses 2, for example, as illustrated in FIGS. 7A and 7B and FIGS. 8A and 8B, it is necessary that a right eye is able to recognize an image of a right-eye pixel, and a left eye is not able to recognize the image of the right-eye pixel. Further, concurrently, for example, as illustrated in FIGS. 9A and 9B and FIGS. 10A and 10B, it is necessary that the left eye is able to recognize an image of a left-eye pixel, and the right eye is not able to recognize the image of the left-eye pixel. To this end, it is preferable to set retardation of the right-eye phase difference region 31A and the right-eye wave plate 41A and retardation of the left-eye phase difference region 31B and the left-eye wave plate 42A as described below.

Specifically, it is preferable that one of the retardation of the right-eye wave plate 41A and the retardation of the left-eye wave plate 42A be λ/4 (λ is a wavelength), and the other be −λ/4. The fact that retardation signs are opposite to each other means that directions of a slow axis are different by 90 deg from each other. At this time, it is preferable that the retardation of the right-eye phase difference region 31A be identical with the retardation of the right-eye wave plate 41A, and it is preferable that the retardation of the left-eye phase difference region 31B be identical with the retardation of the left-eye wave plate 42A.

[Method of Manufacturing Display Unit 1]

Next, a description will be given of an example of a method of manufacturing the phase difference device 30 and the optical laminated body 40 with reference to FIGS. 11A to 12D. FIGS. 11A to 11C illustrate an example of manufacturing steps of the phase difference device 30. FIGS. 12A to 12D illustrate an example of manufacturing steps of the optical laminated body 40.

First, an alignment base material having alignment function on the surface is formed. For example, a mold in which two kinds of groove regions having different groove extension directions from each other are formed on the surface thereof is prepared. Next, for example, a UV hardening resin layer containing a UV hardening acryl resin liquid is arranged on the surface of the mold. After that, the UV hardening resin layer is sealed with a base material film composed of, for example, TAC. Next, the UV hardening resin layer is irradiated with ultraviolet to harden the UV hardening resin layer. After that, the mold is exfoliated. Accordingly, the alignment base material is formed. The alignment base material may be formed by forming a photo-alignment film on the surface of the base material film.

Next, a phase difference film 110 is formed. First, the surface of the alignment base material (hereinafter referred to as alignment base material 100) formed as above is coated with a liquid crystal layer containing a liquid crystalline monomer by, for example, a roll coater or the like. At this time, for the liquid crystal layer, a solvent for dissolving the liquid crystalline monomer, a polymer initiator, a polymer inhibitor, an interface active agent, a leveling agent and the like are able to be used according to needs.

Subsequently, alignment treatment (heating treatment) of the liquid crystalline monomer of the liquid crystal layer on the alignment base material is provided. The heating treatment is performed at temperature that is equal to or higher than phase transition temperature of the liquid crystalline monomer. In particular, in the case of using a solvent, the heating treatment is performed at temperature that is equal to or higher than temperature at which the solvent is dried. In some cases, by coating the liquid crystalline monomer in the previous step, shear stress is applied to the interface between the liquid crystalline monomer and the alignment base material, alignment due to flow (flowage alignment) and alignment due to force (external force alignment) are generated, and accordingly liquid crystal molecules are aligned in unintentional direction. The foregoing heating treatment is performed for once cancelling the alignment state of the liquid crystalline monomer that has been aligned in such an unintentional direction. Thereby, in the liquid crystal layer, the solvent is dried, only the liquid crystalline monomer is left, and the state becomes an isotropic phase.

After that, the liquid crystal layer is cooled down to temperature slightly lower than the phase transition temperature. Thereby, the liquid crystalline monomer is aligned according to alignment regulating force of the alignment base material. For example, the liquid crystalline monomer is aligned along the extension direction of fine grooves of the surface of the alignment base material. Subsequently, the liquid crystal layer after alignment treatment is irradiated with, for example, UV light, and thereby the liquid crystalline monomer is polymerized. Thereby, the alignment state of the liquid crystal molecules is fixed, and the right-eye phase difference region 31A and the left-eye phase difference region 31B are formed. Accordingly, the phase difference film 110 is completed (refer to FIG. 11A).

Next, the phase difference device 30 is manufactured. First, the phase difference film 110 and the anti-glare film 32 having the anti-glare layer 32B on the surface of the base material 32A are layered so that the phase difference layer 31 and the base material 32A are contacted with each other with the adhesive layer 30A in between (FIGS. 11A and 11B). The adhesive layer 30A may be provided on the anti-glare film 32 side or on the phase difference film 110 side. After that, the alignment base material 100 is exfoliated (FIG. 11C). Thus, the phase difference device 30 is completed.

Next, the optical laminated body 40 is formed. Specifically, the phase difference device 30 and the polarization plate 21B are layered so that the phase difference layer 31 and the polarization plate 21B are contacted with each other with the adhesive layer 40A in between (FIGS. 12A and 12B). The adhesive layer 40A may be provided on the phase difference layer 31 side or on the polarization plate 21B side. Accordingly, the optical laminated body 40 is completed.

Finally, the optical laminated body 40 and the transparent substrate 29 are layered so that the polarization plate 21B and the transparent substrate 29 are contacted with each other with the adhesive layer 20A in between (FIGS. 12C and 12D). The adhesive layer 20A may be provided on the polarization plate 21B side, or may be provided on the transparent substrate 29 side. Thus, the laminated body composed of the liquid crystal display panel 20 and the phase difference device 30 is completed.

[Basic Operation]

Next, a description will be given of an example of a basic operation in displaying an image in the display unit 1 of this embodiment with reference to FIGS. 7A and 7B to FIGS. 10A and 10B.

First, in a state that light irradiated from the backlight unit 10 enters the liquid crystal display panel 20, a parallax signal including a right-eye image and a left-eye image as a video signal is inputted to the liquid crystal display panel 20. The right-eye image light L1 is outputted from a pixel in an odd number row (FIGS. 7A and 7B or FIGS. 8A and 8B), and the left-eye image light L2 is outputted from a pixel in an even number row (FIGS. 9A and 9B or FIGS. 10A and 10B).

After that, the right-eye image light L1 and the left-eye image light L2 are converted into oval polarized light by the right-eye phase difference region 31A and the left-eye phase difference region 31B of the phase difference device 30, and are subsequently outputted outside from the video display face 1A of the display unit 1. After that, the light outputted outside of the display unit 1 enters the polarizing glasses 2. The elliptically-polarized light is returned to linear polarized light by the right-eye wave plate 41A and the left-eye wave plate 42A. After that, the light enters the polarization plates 41B and 42B.

At this time, a polarization axis of light corresponding to the right-eye image light L1 out of the light entering the polarization plates 41B and 42B is parallel to the polarization axis AX6 of the polarization plate 41B, and is perpendicular to the polarization axis AX7 of the polarization plate 42B. Thus, the light corresponding to the right-eye image light L1 out of the light entering the polarization plates 41B and 42B is transmitted through only the polarization plate 41B, and reaches a right eye of an observer (FIGS. 7A and 7B or FIGS. 8A and 8B).

Meanwhile, a polarization axis of light corresponding to the left-eye image light L2 out of the light entering the polarization plates 41B and 42B is perpendicular to the polarization axis AX6 of the polarization plate 41B, and is parallel to the polarization axis AX7 of the polarization plate 42B. Thus, the light corresponding to the left-eye image light L2 out of the light entering the polarization plates 41B and 42B is transmitted through only the polarization plate 42B, and reaches a left eye of the observer (FIGS. 9A and 9B or FIGS. 10A and 10B).

As described above, the light corresponding to the right-eye image light L1 reaches the right eye of the observer, and the light corresponding to the left-eye image light L2 reaches the left eye of the observer. As a result, the observer is able to perceive a displayed image on the video display face 1A of the display unit 1 as a stereoscopic image.

[Effect]

Next, a description will be given of an effect of the display unit 1 of this embodiment. In this embodiment, as a base material to support the phase difference layer 31, the polarization plate 21B or the base material 32A supporting the anti-glare layer 32B is used. Thereby, compared to a case that a base material to support the phase difference layer 31 is provided separately, the thickness of the optical laminated body 40 is decreased. The reason why a base material to support the phase difference layer 31 is not provided is that the base material (alignment base material 100) supporting the phase difference layer 31 is exfoliated in the course of manufacturing. Another reason why a base material to support the phase difference layer 31 is not provided is that in exfoliating the alignment base material 100, the base material 32A supporting the anti-glare layer 32B functions as a base material to support the phase difference layer 31. In this embodiment, since the thickness of the optical laminated body is decreased in the above-described manner, deterioration of 3D characteristics (crosstalk) is able to be decreased.

Further, in this embodiment, the alignment base material 100 is exfoliated in the course of forming the phase difference device 30. Therefore, once the alignment base material 100 is formed, the alignment base material 100 is able to be used repeatedly in forming the phase difference device 30. Thereby, compared to a case that the alignment base material 100 is formed point by point, manufacturing time and manufacturing cost of the display unit 1 are able to be decreased.

2. Modifications

Modification 1

Figure 13:
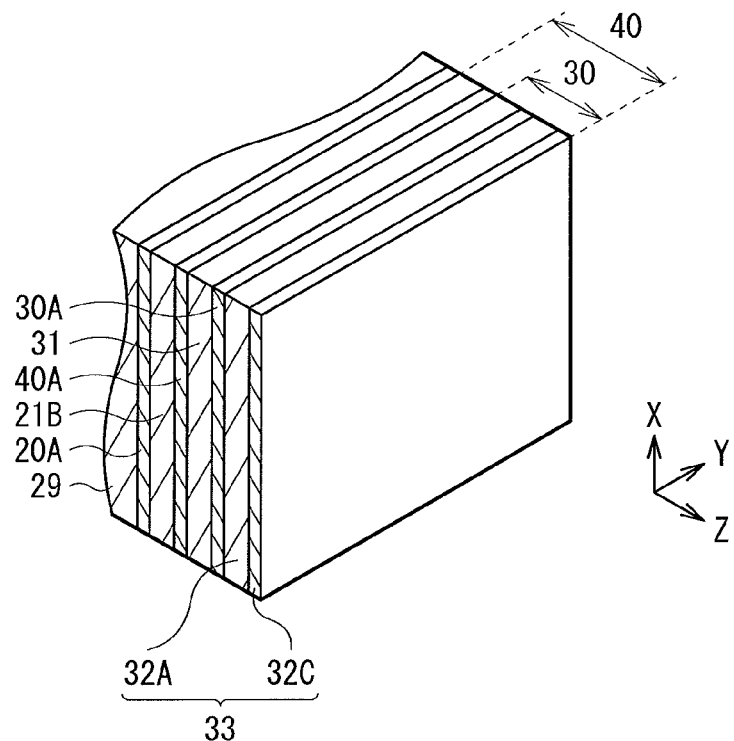
FIG. 13 is a cross sectional view illustrating a first modification of the configuration of the optical laminated body of FIG. 4A.

In the foregoing embodiment, for example, as illustrated in FIG. 13, it is possible that an antireflection layer 32C that decreases surface reflection and increases transmittance is provided instead of the anti-glare layer 32B, and an antireflection film 33 is provided instead of the anti-glare film 32.

Modification 2

Figure 14:
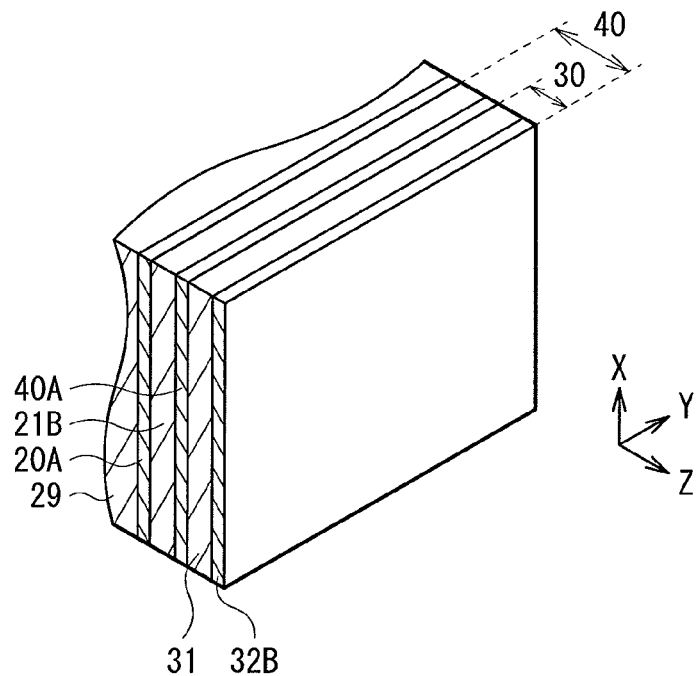
FIG. 14 is a cross sectional view illustrating an example of a second modification of the configuration of the optical laminated body of FIG. 4A.
Figure 15:
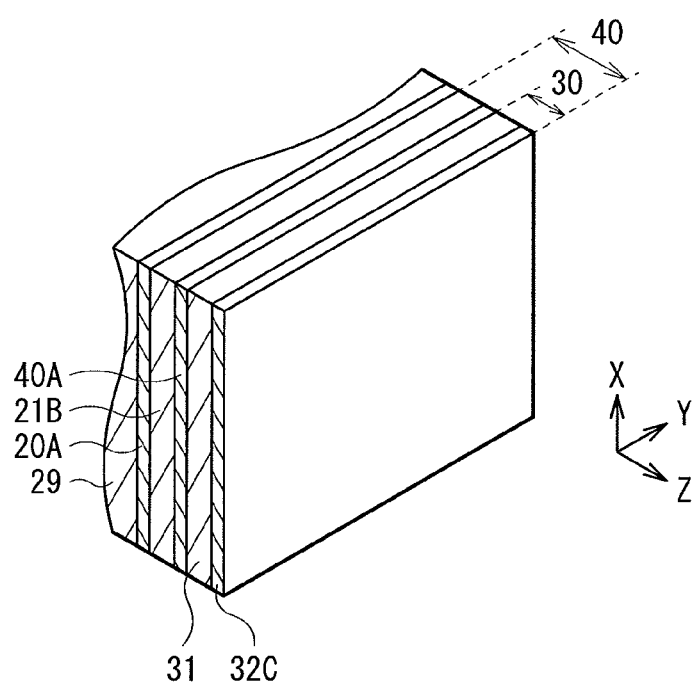
FIG. 15 is a cross sectional view illustrating another example of the second modification of the configuration of the optical laminated body of FIG. 4A.

Further, in the foregoing embodiment and the modification thereof, for example, as illustrated in FIG. 14 and FIG. 15, it is possible that the base material 32A and the adhesive layer 30A are omitted, and the phase difference layer 31 is contacted with the anti-glare layer 32B or the antireflection layer 32C. In this case, effect of phase differences existing in the base material 32A and the adhesive layer 30A does not exist at all. Therefore, deterioration of 3D characteristics (crosstalk) is able to be further decreased.

To omit the base material 32A and the adhesive layer 30A, it is necessary to adopt a method different from the manufacturing method described in the foregoing embodiment. Therefore, a description will be given of an example of manufacturing methods in the case of omitting the base material 32A and the adhesive layer 30A.

First, as in the foregoing embodiment, the phase difference film 110 is formed. Next, the anti-glare layer 32B or the antireflection layer 32C is formed on the phase difference film 110 (see FIG. 16A). Subsequently, the phase difference film 110 and a base material 130 are layered so that the anti-glare layer 32B or the antireflection layer 32C is contacted with the base material 130 with an adhesive layer 140 in between (FIGS. 16A and 16B). The adhesive layer 140 may be provided on the base material 130 side, or may be provided on the anti-glare layer 32B side or the antireflection layer 32C side. After that, the alignment base material 100 is exfoliated (FIG. 16C). Thereby, an optical film 150 including the phase difference layer 31 and the anti-glare layer 32B or the antireflection layer 32C is completed.

Figure 17A:
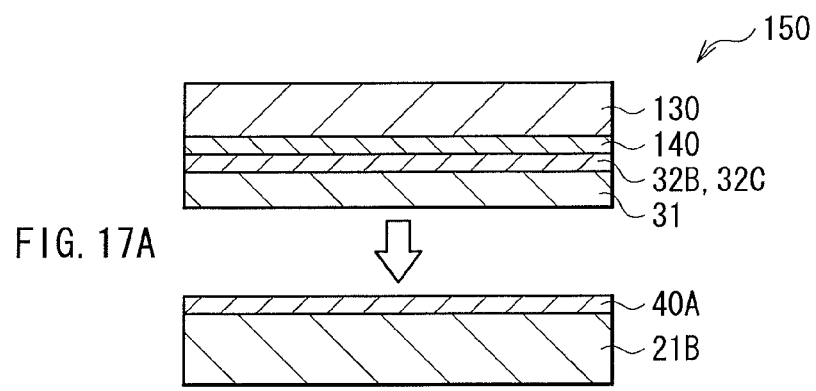
FIGS. 17A to 17C are schematic views for explaining steps following the steps shown in FIGS. 16A to 16C.
Figure 17B:
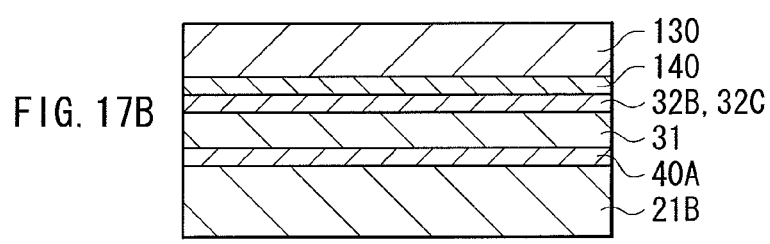
Figure 17C:
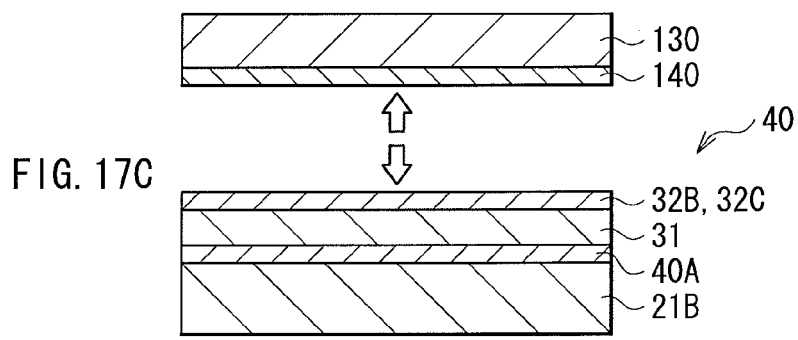

Next, the optical laminated body 40 is formed. Specifically, the optical film 150 and the polarization plate 21B are layered so that the phase difference layer 31 and the polarization plate 21B are contacted with each other with the adhesive layer 40A in between (FIGS. 17A and 17B). The adhesive layer 40A may be provided on the phase difference layer 31 side, or may be provided on the polarization plate 21B side. After that, the base material 130 and the adhesive layer 140 are exfoliated (FIG. 17C). Thereby, the optical laminated body 40 is completed.

Finally, the optical laminated body 40 and the transparent substrate 29 are layered so that the polarization plate 21B and the transparent substrate 29 are contacted with each other with the adhesive layer 20A in between (FIGS. 18A and 18B). The adhesive layer 20A may be provided on the polarization plate 21B side, or may be provided on the transparent substrate 29 side. Accordingly, the laminated body composed of the liquid crystal display panel 20 and the phase difference device 30 is completed.

Modification 3

Figure 20:
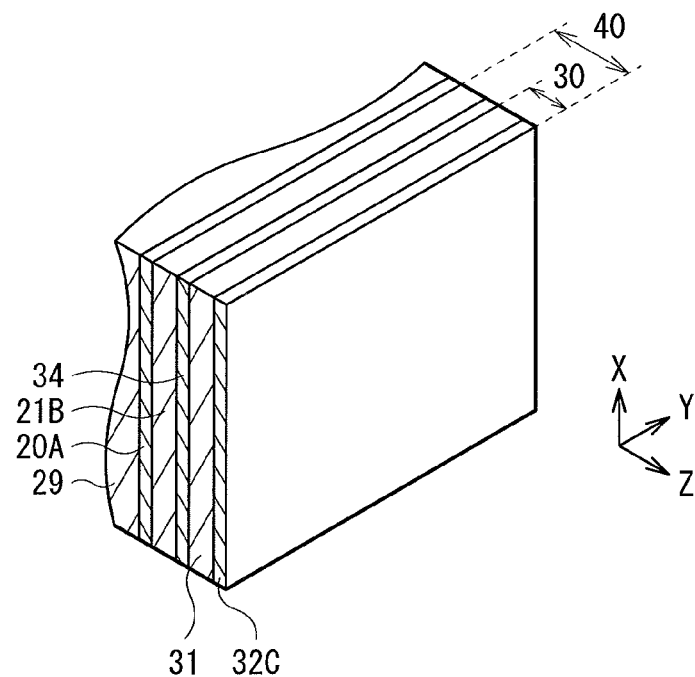
FIG. 20 is a cross sectional view illustrating another example of the third modification of the configuration of the optical laminated body of FIG. 4A.

Further, in the foregoing embodiment and the modifications thereof, for example, as illustrated in FIG. 19 and FIG. 20, it is possible that the base material 32A and the adhesive layer 30A are omitted, and an alignment film 34 is provided instead of the adhesive layer 40A. In this case, again, effect of phase differences existing in the base material 32A and the adhesive layer 30A does not exist at all. Therefore, deterioration of 3D characteristics (crosstalk) is able to be further decreased. Further, in this case, as described later, the alignment film 34, the phase difference layer 31, and the anti-glare layer 32B or the antireflection layer 32C are able to be formed on the surface of the polarization plate 21B without a bonding step. Thereby, compared to a case of using the bonding step, manufacturing time and manufacturing cost of the display unit 1 are able to be decreased.

Figure 21:
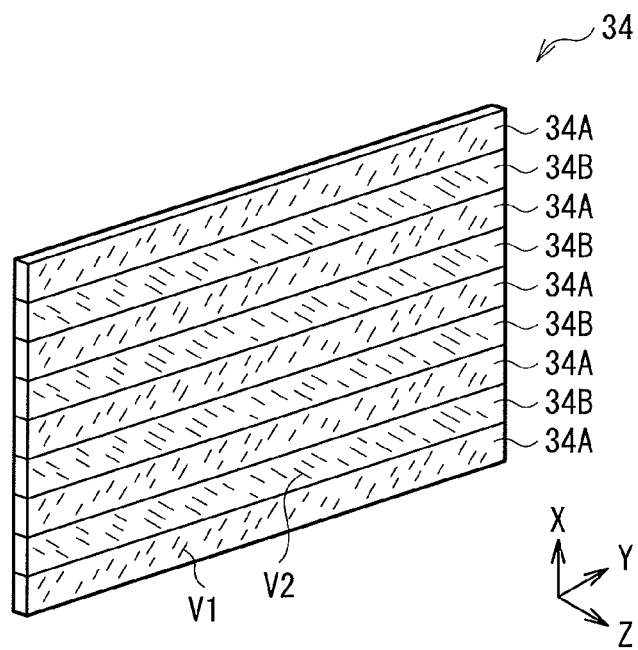
FIG. 21 is a perspective view for explaining an example of a configuration of an alignment film of FIGS. 19 and 20.

The foregoing alignment film 34 has a function for aligning an alignment material such as liquid crystal in a specific direction. The alignment film 34 is made of a transparent resin such as a UV hardening resin and an electron beam hardening resin or a thermoplastic transparent resin. The alignment film 34 is provided on the surface on the light output side of the polarization plate 21B. For example, as illustrated in FIG. 21, the alignment film 34 has two kinds of alignment regions having different alignment directions from each other (a right-eye alignment region 34A and a left-eye alignment region 34B). The right-eye alignment region 34A and the left-eye alignment region 34B have, for example, a strip-shape extending in one common direction (horizontal direction). The right-eye alignment region 34A and the left-eye alignment region 34B are alternately arranged in the short-side direction (vertical direction) of the right-eye alignment region 34A and the left-eye alignment region 34B. The right-eye alignment region 34A and the left-eye alignment region 34B are arranged in accordance with the pixels of the liquid crystal display panel 20. For example, the right-eye alignment region 34A and the left-eye alignment region 34B are arranged at intervals corresponding to pixel intervals in the short-side direction (vertical direction) of the liquid crystal display panel 20.

For example, as illustrated in FIG. 21, the right-eye alignment region 34A has a plurality of grooves V1 extending in the direction intersecting with the polarization axis AX3 of the polarization plate 21B at 45 deg. Meanwhile, as illustrated in FIG. 21, the left-eye alignment region 34B has a plurality of grooves V2 extending in the direction that intersects with the polarization axis AX3 of the polarization plate 21B at 45 deg and that is perpendicular to the extension direction of the groove V1. For example, the grooves V1 and V2 respectively extend in the 45-degree diagonal direction in the case where the polarization axis AX3 of the polarization plate 21B is in the vertical direction or in the horizontal direction. Further, though not illustrated, in the case where the polarization axis AX3 of the polarization plate 21B is in the 45-degree diagonal direction, the groove V1 extends, for example, in the horizontal direction, and the groove V2 extends, for example, in the vertical direction.

The respective grooves V1 may linearly extend in one direction, or the respective grooves V1 may extend in one direction while swaying (meandering). The cross sectional shape of the respective grooves V1 is, for example, of a V-shape. Similarly, the cross sectional shape of the respective grooves V2 is, for example, of a V-shape. In other words, the cross sectional shape of the right-eye alignment region 34A and the left-eye alignment region 34B as a whole is saw-like. In the groove structure, intervals are preferably smaller, are several μm or less, and are more preferably several hundred nm or less. Such a shape is formed in block by, for example, transfer with the use of a mold. Further, the alignment film 34 does not necessarily have the groove structure described above, but may be a photo-alignment film formed by polarized UV irradiation. The photo-alignment film is able to be formed by previously coating with a material that is to be aligned in the UV polarization direction when being irradiated with polarized UV, and radiating UV light polarized in respectively different directions for the right-eye alignment region 34A and the left-eye alignment region 34B.

Next, a description will be given of an example of a method of manufacturing the optical laminated body 40 according to this modification. First, the alignment film 34 is formed on the surface of the polarization plate 21B. For example, first, the surface of the polarization plate 21B is coated with an energy hardening transparent resin. Next, while the transparent resin is pressed by a mold having two kinds of groove regions having different extension directions from each other of fine grooves, energy is given to the transparent resin to harden the transparent resin. After that, the mold is exfoliated. Thus, for example, as illustrated in FIG. 21, the alignment film 34 that has the right-eye alignment region 34A having the grooves V1 and the left-eye alignment region 34B having the grooves V2 is formed.

Next, the phase difference layer 31 is formed on the alignment film 34. For example, first, the surface of the alignment film 34 is coated with a liquid crystal layer containing a liquid crystalline monomer by, for example, a roll coater or the like. At this time, for the liquid crystal layer, a solvent for dissolving the liquid crystalline monomer, a polymer initiator, a polymer inhibitor, an interface active agent, a leveling agent, and the like are able to be used according to needs.

Subsequently, alignment treatment (heating treatment) of the liquid crystalline monomer of the liquid crystal layer on the alignment film 34 is provided. The heating treatment is performed at temperature that is equal to or higher than phase transition temperature of the liquid crystalline monomer. In particular, in the case of using a solvent, the heating treatment is performed at temperature that is equal to or higher than temperature at which the solvent is dried. In some cases, by coating the liquid crystalline monomer in the previous step, shear stress is applied to the interface between the liquid crystalline monomer and the alignment base material, alignment due to flow (flowage alignment) and alignment due to force (external force alignment) are generated, and accordingly, liquid crystal molecules are aligned in unintentional direction. The foregoing heating treatment is performed for once cancelling the alignment state of the liquid crystalline monomer that has been aligned in such an unintentional direction. Thereby, in the liquid crystal layer, the solvent is dried, only the liquid crystalline monomer is left, and the state becomes an isotropic phase.

After that, the liquid crystal layer is cooled down to temperature slightly lower than the phase transition temperature. Thereby, the liquid crystalline monomer is aligned according to alignment regulating force of the alignment film 34. For example, the liquid crystalline monomer is aligned along the extension direction of fine grooves of the surface of the alignment film 34. Subsequently, the liquid crystal layer after alignment treatment is irradiated with, for example, UV light, and thereby the liquid crystalline monomer is polymerized. Thereby, an alignment state of the liquid crystal molecules is fixed, and the right-eye phase difference region 31A and the left-eye phase difference region 31B are formed. Accordingly, the phase difference layer 31 is formed. After that, the anti-glare layer 32B or the antireflection layer 32C is formed on the phase difference layer 31. Accordingly, the optical laminated body 40 is completed (see FIG. 22A).

Finally, the optical laminated body 40 and the transparent substrate 29 are layered so that the polarization plate 21B and the transparent substrate 29 are contacted with each other with the adhesive layer 20A in between (FIGS. 22A and 22B). The adhesive layer 20A may be provided on the polarization plate 21B side, or may be provided on the transparent substrate 29 side. Thus, the laminated body composed of the liquid crystal display panel 20 and the phase difference device 30 is completed.

Modification 4

Further, in the foregoing embodiment and the modifications thereof, the liquid crystal display panel 20 is a transmissive panel. However, the liquid crystal display panel 20 may be a reflective panel. In this case, for example, as illustrated in FIG. 23, the backlight unit 10 is omitted, and a reflective liquid crystal display panel 50 is provided instead of the transmissive liquid crystal display panel 20.

Figure 24:
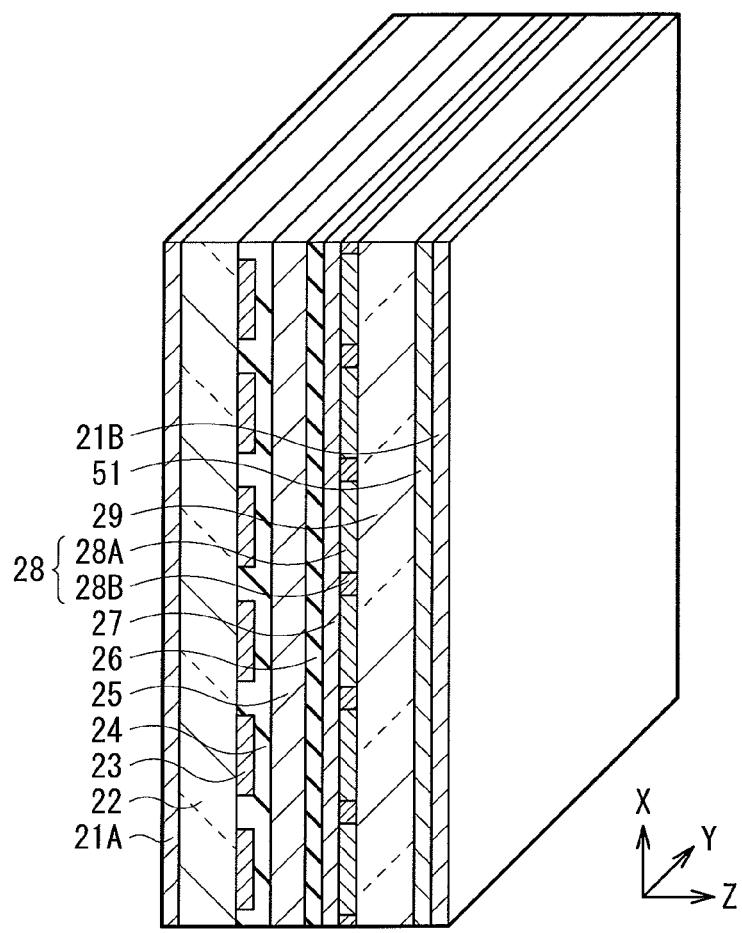
FIG. 24 is a cross sectional view illustrating an example of a configuration of a liquid crystal display panel of FIG. 23.

The reflective liquid crystal display panel 50 is obtained by providing a λ/4 wave plate 51 between the transparent substrate 29 and the polarization plate 21B in the liquid crystal display panel 20 of the foregoing embodiment, for example, as illustrated in FIG. 24. For example, in the reflective liquid crystal display panel 50, the pixel electrode 23 may be formed of a metal electrode having light reflection function.

Modification 5

Further, in the foregoing embodiment and the modifications thereof, the display unit 1 includes the liquid crystal display panel 20. However, the display unit 1 may include other display panel such as an organic EL display panel, a cathode-ray tube, and a plasma display panel instead of the liquid crystal display panel 20. However, in this case, it is necessary to provide the polarization plate 21B between such other display panel and the phase difference device 30.

Modification 6

Further, in the foregoing embodiment and the modifications thereof, the phase difference layer 31 has the two kinds of phase difference regions 31A and 31B having different slow axis directions from each other. However, the phase difference layer 31 may have three kinds of phase difference regions having different slow axis directions from each other.

The present disclosure contains subject matter related to that disclosed in Japanese Priority Patent Application JP 2011-45981 filed in the Japanese Patent Office on Mar. 3, 2011, the entire contents of which is hereby incorporated by reference.

It should be understood by those skilled in the art that various modifications, combinations, sub combinations and alternations may occur depending on design requirements and other factors insofar as they are within the scope of the appended claims or the equivalents thereof.

What is claimed is:

1. An optical laminated body comprising:
   a phase difference layer that has, in a same plane, two or more phase difference regions having different slow axis directions from each other, the phase difference layer having oppositely facing first and second faces;
   a polarization plate secured to the first face of the phase difference layer by a bonding layer or an adhesive layer;
   a base material with a first face secured to the second face of the phase difference layer by a bonding layer or an adhesive layer in between; and
   an antireflection layer or an anti-glare layer directly secured to a second face of the b of the base material.

2. The optical laminated body of claim 1, wherein the phase difference layer comprises two kinds of phase difference region that are stripe shaped and alternatingly arranged in the plane of the phase difference layer.

3. The optical laminated body of claim 1, wherein the phase difference layer comprises two phase difference regions that are rectangular in shape and arranged in side-by-side relationship.

4. The optical laminated body of claim 1, wherein the base material is transparent resin selected from the group consisting of triacetyl cellulose (TAC), cycloolefin polymer (COP), cycloolefin copolymer (COC) and polymethyl methacrylate (PMMA).

5. The optical laminated body of claim 1, wherein the phase difference layer contains a polymerized polymer liquid crystal material.

6. The optical laminated body of claim 1, wherein the antiglare layer.

* * * * *